(12) United States Patent
Yanakiev et al.

(10) Patent No.: US 8,510,003 B2
(45) Date of Patent: Aug. 13, 2013

(54) CLOSED-LOOP TORQUE PHASE CONTROL FOR SHIFTING AUTOMATIC TRANSMISSION GEAR RATIOS BASED ON FRICTION ELEMENT LOAD ESTIMATION

(75) Inventors: Diana Yanakiev, Birmingham, MI (US); Yuji Fujii, Ann Arbor, MI (US); Eric Tseng, Canton, MI (US); Gregory Michael Pietron, Canton, MI (US); Joseph F Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 12/861,387

(22) Filed: Aug. 23, 2010

(65) Prior Publication Data

US 2010/0318269 A1   Dec. 16, 2010

Related U.S. Application Data

(63) Continuation-in-part of application No. 12/421,339, filed on Apr. 9, 2009, now Pat. No. 8,255,130.

(51) Int. Cl.
  *F16H 59/14* (2006.01)

(52) U.S. Cl.
  USPC .......................................................... 701/55

(58) Field of Classification Search
  USPC .................................................. 701/55, 56
  See application file for complete search history.

(56) References Cited

U.S. PATENT DOCUMENTS

| | | | |
|---|---|---|---|
| 4,220,058 A | 9/1980 | Petzold | |
| 4,343,387 A | 8/1982 | Hofbauer | |
| 4,576,265 A | 3/1986 | Kumura et al. | |
| 4,653,621 A | 3/1987 | Oshiage | |
| 4,724,723 A | 2/1988 | Lockhart et al. | |
| 5,303,614 A | 4/1994 | Sakaki et al. | |
| 6,227,999 B1 | 5/2001 | Wheeler | |
| 6,487,925 B2 | 12/2002 | Fischer et al. | |
| 6,691,011 B1 * | 2/2004 | Jacobs | 701/54 |
| 6,909,953 B2 * | 6/2005 | Joe et al. | 701/51 |
| 6,912,456 B2 * | 6/2005 | Eck et al. | 701/54 |
| 6,961,647 B2 | 11/2005 | Matsumura et al. | |
| 6,991,584 B2 | 1/2006 | Cowan | |
| 7,101,310 B2 | 9/2006 | Smith et al. | |
| 7,125,364 B2 | 10/2006 | Cring | |
| 7,131,932 B2 | 11/2006 | Fähland et al. | |
| 7,258,648 B2 | 8/2007 | Smith et al. | |
| 7,445,581 B2 | 11/2008 | Cring | |
| 7,478,572 B2 | 1/2009 | Maten et al. | |
| 8,010,265 B2 * | 8/2011 | Samie et al. | 701/55 |
| 2009/0264253 A1 | 10/2009 | Herchick et al. | |
| 2010/0318269 A1 * | 12/2010 | Yanakiev et al. | 701/55 |

* cited by examiner

*Primary Examiner* — Kevin Hurley
(74) *Attorney, Agent, or Firm* — Diederiks & Whitelaw, PLC

(57) ABSTRACT

A closed loop shift control apparatus and method based on estimated torque in friction elements controls a torque transfer phase when shifting from a low gear configuration to a high gear configuration for an automatic transmission system. When pressure actuated friction elements are selectively engaged and released to establish torque flow paths in the transmission, estimates of torsional load exerted on the off-going friction element are used to predict the optimal off-going friction element release timing for achieving a consistent shift feel. The estimated torque is preferably calculated by using estimated torque signals generated as a function of speed measurements represented either the engine speed and turbine output speed or transmission output speed and wheel speed under dynamically changing conditions.

14 Claims, 20 Drawing Sheets

CLOSED-LOOP TORQUE PHASE CONTROL FOR SHIFTING AUTOMATIC TRANSMISSION GEAR RATIOS BASED ON FRICTION ELEMENT LOAD ESTIMATION

CROSS-REFERENCE TO RELATED APPLICATIONS

This application is a continuation in part of U.S. patent application Ser. No. 12/421,339, filed on Apr. 9, 2009, which application is hereby fully incorporated by reference in its entirety.

FIELD OF INVENTION

The present invention pertains to the field of automatic transmissions for motor vehicles and, more particularly, to a shift control apparatus and method based on friction element load level.

BACKGROUND OF THE INVENTION

A step-ratio automatic transmission system in a vehicle utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased.

Various planetary gear configurations are found in modern automatic transmissions. However, the basic principle of shift kinematics remains similar. Shifting a step-ratio automatic transmission having multiple planetary gearsets is accompanied by applying and/or releasing friction elements to change speed and torque relationships by altering the torque path through the planetary gearsets. Friction elements are usually actuated either hydraulically or mechanically.

In the case of a synchronous friction element-to-friction element upshift, a first pressure actuated torque establishing element, referred to as an off-going friction element, is released while a second pressure actuated torque establishing element, referred to as an on-coming friction element, engages in order to lower a transmission gear ratio. A typical upshift event is divided into preparatory, torque and inertia phases. During the preparatory phase, an on-coming friction element piston is stroked to prepare for its engagement while an off-going friction element torque-holding capacity is reduced as a step toward its release. During the torque phase, which may be referred to as a torque transfer phase, on-coming friction element torque is raised while the off-going friction element is still engaged. The output shaft torque of the automatic transmission typically drops during the torque phase, creating a so-called torque hole. When the on-coming friction element develops enough torque, the off-going friction element is released, marking the end of the torque phase and the beginning of the inertia phase. During the inertia phase, the on-coming friction element torque is adjusted to reduce its slip speed toward zero. When the on-coming friction element slip speed reaches zero, the shift event is completed.

In a synchronous shift, the timing of the off-going friction element release must be synchronized with the on-coming friction element torque level to deliver a consistent shift feel. A premature release leads to engine speed flare and a deeper torque hole, causing perceptible shift shock for a vehicle occupant. A delayed release causes a tie-up of gear elements, also resulting in a deep and wide torque hole for inconsistent shift feel. A conventional shift control relies on speed measurements of the powertrain components, such as an engine and a transmission input shaft, to control the off-going friction element release process during the torque phase. A conventional torque phase control method releases the off-going friction element from its locked state through an open-loop control based on a pre-calibrated timing, following a pre-determined off-going friction element actuator force profile. This conventional method does not ensure optimal off-going friction element release timing and therefore results in inconsistent shift feel.

Alternatively, a controller may utilize speed signals to gauge off-going friction element release timing. That is, the off-going friction element is released if the controller detects a sign of gear tie-up, which may be manifested as a measurable drop in input shaft speed. When a release of the off-going friction element is initiated prematurely before the on-coming friction element develops enough torque, engine speed or automatic transmission input shaft speed may rise rapidly in an uncontrolled manner. If this so-called engine speed flair is detected, the controller may increase off-going friction element control force to quickly bring down automatic transmission input speed or off-going friction element slip speed. This speed-based or slip-based approach often results in a hunting behavior between gear tie-up and engine flair, leading to inconsistent shift feel. Furthermore, off-going friction element slip control is extremely difficult because of its high sensitivity to slip conditions and a discontinuity between static and dynamic frictional forces. A failure to achieve a seamless slip control during the torque phase leads to undesirable shift shock.

In the case of a non-synchronous automatic transmission, the upshifting event involves engagement control of only an on-coming friction element, while a companion clutching component, typically a one-way coupling, automatically disengages to reduce the speed ratio. The non-synchronous upshift event can also be divided into three phases, which may also be referred to as a preparatory phase, a torque phase and an inertia phase. The preparatory phase for the non-synchronous upshift is a time period prior to the torque phase. The torque phase for the non-synchronous shift is a time period when the on-coming friction element torque is purposely raised for its engagement until the one-way coupling starts slipping or overrunning. This definition differs from that for the synchronous shift because the non-synchronous shift does not involve active control of a one-way coupling or the off-going friction element. The inertia phase for the non-synchronous upshift is a time period when the one-way coupling starts to slip, following the torque phase. According to a conventional upshift control, during the torque phase of the upshifting event for a non-synchronous automatic transmission, the torque transmitted through the oncoming friction element increases as it begins to engage. A kinematic structure of a non-synchronous upshift automatic transmission is designed in such a way that torque transmitted through the one-way coupling automatically decreases in response to increasing oncoming friction element torque. As a result of this interaction, the automatic transmission output shaft torque drops during the torque phase, which again creates a so-called "torque hole." Before the one-way coupling disengages, as in the case previously described, a large torque hole can be perceived by a vehicle occupant as an unpleasant shift shock. An example of a prior art shift control arrangement can be found in U.S. Pat. No. 7,351,183 which is hereby incorporated by reference.

A transmission schematically illustrated at 2 in FIG. 1 is an example of a prior art multiple-ratio transmission with a controller 4 wherein ratio changes are controlled by friction elements acting on individual gear elements. Engine torque from vehicle engine 5 is distributed to torque input element 10 of hydrokinetic torque converter 12. An impeller 14 of torque converter 12 develops turbine torque on a turbine 16 in a known fashion. Turbine torque is distributed to a turbine shaft, which is also transmission input shaft 18. Transmission 2 of FIG. 1 includes a simple planetary gearset 20 and a compound planetary gearset 21. Gearset 20 has a permanently fixed sun gear S1, a ring gear R1 and planetary pinions P1 rotatably supported on a carrier 22. Transmission input shaft 18 is drivably connected to ring gear R1. Compound planetary gearset 21, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P2/3, P3 of gearset 21 are rotatably supported on compound carrier 23. Ring gear R3 is drivably connected to a torque output shaft 24, which is drivably connected to vehicle traction wheels through a differential and axle assembly (not shown). Gearset 20 is an underdrive ratio gearset arranged in series with respect to compound gearset 21. Typically, transmission 2 preferably includes a lockup or torque converter bypass clutch, as shown at 25, to directly connect transmission input shaft 18 to engine 5 after a torque converter torque multiplication mode is completed and a hydrokinetic coupling mode begins. FIG. 2 is a chart showing a clutch and brake friction element engagement and release pattern for establishing each of six forward driving ratios and a single reverse ratio for transmission 2.

During operation in the first four forward driving ratios, carrier P1 is drivably connected to sun gear S3 through shaft 26 and forward friction element A. During operation in the third ratio, fifth ratio and reverse, direct friction element B drivably connects carrier 22 to shaft 27, which is connected to large pitch diameter sun gear S2. During operation in the fourth, fifth and sixth forward driving ratios, overdrive friction element E connects turbine shaft 18 to compound carrier 23 through shaft 28. Friction element C acts as a reaction brake for sun gear S2 during operation in second and sixth forward driving ratios. During operation of the third forward driving ratio, direct friction element B is applied together with forward friction element A. The elements of gearset 21 then are locked together to effect a direct driving connection between shaft 28 and output shaft 26. The torque output side of forward friction element A is connected through torque transfer element 29 to the torque input side of direct friction element B, during forward drive. The torque output side of direct friction element B, during forward drive, is connected to shaft 27 through torque transfer element 30. Reverse drive is established by applying low-and-reverse brake D and friction element B.

For the purpose of illustrating one example of a synchronous ratio upshift for the transmission of FIG. 1, it will be assumed that an upshift will occur between the first ratio and the second ratio. On such a 1-2 upshift, friction element C starts in the released position before the shift and is engaged during the shift while low/reverse friction element D starts in the engaged position before the shift and is released during the shift. Forward friction element A stays engaged while friction element B and overdrive friction element E stay disengaged throughout the shift. More details of this type of transmission arrangement are found in U.S. Pat. No. 7,216,025, which is hereby incorporated by reference.

FIG. 3 depicts a general process of a synchronous friction element-to-friction element upshift event from a low gear configuration to a high gear configuration for the automatic transmission system of FIG. 1. For example, the process has been described in relation to a 1-2 synchronous ratio upshift above wherein friction element C is an oncoming friction element and low/reverse friction element D is an off-going friction element, but it is not intended to illustrate a specific control scheme.

The shift event is divided into three phases: a preparatory phase 31, a torque phase 32 and an inertia phase 33. During preparatory phase 31, an on-coming friction element piston is stroked (not shown) to prepare for its engagement. At the same time, off-going friction element control force is reduced as shown at 34 as a step toward its release. In this example, off-going friction element D still retains enough torque capacity shown at 35 to keep it from slipping, maintaining transmission 2 in the low gear configuration. However, increasing on-coming friction element control force shown at 36 reduces net torque flow within gearset 21. Thus, the output shaft torque drops significantly during torque phase 32, creating a so-called torque hole 37. A large torque hole can be perceived by a vehicle occupant as an unpleasant shift shock. Toward the end of torque phase 32, off-going friction element control force is dropped to zero as shown at 38 while on-coming friction element apply force continues to rise as shown at 39. Torque phase 32 ends and inertia phase 33 begins when off-going friction element D starts slipping as shown at 40. During inertia phase 33, off-going friction element slip speed rises as shown at 41 while on-coming friction element slip speed decreases as shown at 42 toward zero at 43. The engine speed and transmission input speed 44 drops as the planetary gear configuration changes. During inertia phase 33, output shaft torque indicated by profile 45 is primarily affected by on-coming friction element C torque capacity indirectly indicated by force profile 46. When on-coming friction element C completes engagement or when its slip speed becomes zero at 43, inertia phase 33 ends, completing the shift event.

FIG. 4 shows a general process of a synchronous friction element-to-friction element upshift event from the low gear configuration to the high gear configuration in which off-going friction element D is released prematurely as shown at 51 compared with the case shown in FIG. 3. When off-going friction element D is released, it breaks a path between automatic transmission input shaft 18 and automatic transmission output shaft 24, depicted in FIG. 1, no longer transmitting torque to automatic transmission output shaft at the low gear ratio. Since on-coming friction element C is yet to carry enough engagement torque as indicated by a low apply force at 52, automatic transmission output shaft torque drops largely, creating a deep torque hole 53 which can be felt as a shift shock. At the same time, engine speed or transmission input speed rapidly increases as shown at 54, causing a condition commonly referred to as engine flare. A large level of engine flare can be audible to a vehicle occupant as unpleasant noise. Once on-corning friction element C develops sufficient engagement torque as indicated by a rising control force at 55, automatic transmission input speed comes down and the output torque rapidly moves to a level at 56 that corresponds to on-coming friction element control force 55. Under certain conditions, this may lead to a torque oscillation 57 that can be perceptible to a vehicle occupant as unpleasant shift shock.

FIG. 5 shows a general process of a friction element-to-friction element upshift event from the low gear configuration to the high gear configuration in which off-going friction element release is delayed as shown at 61 compared with the case shown in FIG. 3. Off-going friction element D remains engaged even after on-coming friction element C develops a large amount of torque as indicated by a large actual control force at 65. Thus, transmission input torque continues to be primarily transmitted to output shaft 24 at the low gear ratio. However, large on-coming friction element control force 65 results in a drag torque, lowering automatic transmission output shaft torque, creating a deep and wide torque hole 63. This condition is commonly referred to as a tie-up of gear elements. A severe tie-up can be felt as a shift shock or loss of power by a vehicle occupant.

As illustrated in FIGS. 3, 4, and 5 a missed synchronization of off-going friction element release timing with respect to on-coming friction element torque capacity leads to engine flare or tie-up. Both conditions lead to varying torque levels and profiles at automatic transmission torque output shaft 24 during shifting. If these conditions are severe, they result in undesirable driving experience such as inconsistent shift feel or perceptible shift shock. The prior art methodology attempts to mitigate the level of missed-synchronization by use of an open loop off-going friction element release control based on speed signal measurements. It also attempts to achieve a consistent on-coming friction element engagement torque by an open-loop approach during a torque phase under dynamically-changing shift conditions.

FIG. 6 illustrates a prior art methodology for controlling a friction element-to-friction element upshift from a low gear configuration to a high gear configuration for automatic transmission 2 in FIG. 1. The prior art on-coming control depicted in FIG. 6 applies to a conventional torque phase control utilized for either a synchronous or non-synchronous shift. In this example, off-going friction element D remains engaged until the end of torque phase 32. Although the focus is placed on torque phase control, FIG. 6 depicts the entire shift control process. As shown, the shift event is divided into three phases: a preparatory phase 31, a torque phase 32 and an inertia phase 33. During preparatory phase 31, an on-coming friction element piston is stroked (not shown) to prepare for its engagement. At the same time, off-going friction element control force is reduced as shown at 34 as a step toward its release. During torque phase 32, controller 4 commands an on-coming friction element actuator to follow a prescribed on-coming friction element control force profile 64 through an open-loop based approach. Actual on-coming friction element control force 65 may differ from prescribed profile 64 due to control system variability. Even if actual control force 65 closely follows prescribed profile 64, on-coming friction element engagement torque may still vary largely from shift to shift due to the sensitivity of the on-coming friction element engagement process to engagement conditions such as lubrication oil flow and friction surface temperature. Controller 4 commands enough off-going element control force 61 to keep off-going element D from slipping, maintaining the planetary gearset in the low gear configuration until the end of torque phase 32. Increasing on-corning friction element control force 65 or engagement torque reduces net torque flow within the low-gear configuration. Thus, output shaft torque 66 drops significantly during torque phase 32, creating so-called torque hole 63. If the variability in on-coming friction element engagement torque significantly alters a shape and depth of torque hole 63, a vehicle occupant may experience inconsistent shift feel. Controller 4 reduces off-going friction element actuator force at 38, following a pre calibrated profile, in order to release it at a pre-determined timing 67. The release timing may be based on a commanded value of on-coming friction element control force 62. Alternatively, off-going friction element D is released if controller 4 detects a sign of significant gear tie-up, which may be manifested as a detectable drop in input shaft speed 44. Inertia phase 33 begins when off-going friction element D is released and starts slipping as shown at 67. During inertia phase 33, off-going friction element slip speed rises as shown at 68 while on-coming friction element slip speed decreases toward zero as shown at 69. Transmission input speed 44 drops as the planetary gear configuration changes. During inertia phase 33, output shaft torque 66 is primarily affected by on-coming friction element torque capacity or control force 65. The shift event completes when the on-coming friction element cones into a locked or engaged position with no slip as shown at 70.

FIG. 7 illustrates another prior art methodology for controlling torque phase 32 of a synchronous upshift process from the low gear configuration to the high gear configuration. In this example, controller 4 allows off-going friction element D to slip during torque phase 32. Although the focus is placed on torque phase control, FIG. 7 depicts the entire shift event. During preparatory phase 31, an on-coming friction element piston is stroked to prepare for its engagement. At the same time, off-going friction element control force 86 is reduced as a step toward its slip. During torque phase 32, on-corning friction element control force is raised in a controlled manner. More specifically, controller 4 commands on-coming friction element actuator to follow a prescribed on-coming friction element control force profile 87 through an open-loop based approach. An actual on-corning friction element control force 88 may differ from the commanded profile 87 due to control system variability. Even if actual control force 88 closely follows commanded profile 87, on-coming friction element engagement torque may still vary largely from shift to shift due to the sensitivity of on-coming friction element engagement process to engagement conditions such as lubrication oil flow and friction surface temperature. Increasing on-coming friction element control force 88 or on-coming friction element engagement torque reduces net torque flow within the low-gear configuration. This contributes to output shaft torque 99 being reduced during torque phase 32, creating a so-called torque hole 85.

If the variability in on-coming friction element engagement torque significantly alters the shape and depth of torque hole 85, the vehicle occupant may experience inconsistent shift feel. A deep torque hole may be perceived as an unpleasant shift shock. During torque phase 32, off-going friction element control force is reduced as shown at 82 to induce an incipient slip 83. Controller 4 attempts to maintain off-going friction element slip at a target level through a closed-loop control based on off-going friction element speed 96 which may be directly measured or indirectly derived from speed measurements at pre-determined locations. A variability in off-going friction element control force 82 of off-going element slip torque may alter the shape and depth of torque hole 85, thus affecting shift feel. If controller 4 inadvertently allows a sudden increase in off-going friction element slip level, automatic transmission input speed or engine speed 90 may surge momentarily, causing the so-called engine speed flair or engine flair. The engine flair may be perceived by a vehicle occupant as an unpleasant sound.

Controller 4 initiates off-going friction element release process at a predetermined timing shown at which may be based on a commanded value of on-coming friction element control force 93. Controller 4 lowers off-going friction element control force, following a pre-calibrated profile 94. If a release of off-going friction element D is initiated prematurely before on-coming friction element C develops enough torque, engine speed or input shaft speed may rise rapidly in an uncontrolled manner. If this engine speed flair 90 is detected, controller 4 increases off-going friction element control force to delay off-going friction element release process. Alternatively, to the pre-determined off-going friction element release timing, controller 4 may utilize speed signals to determine a final off-going friction element release timing. When a sign of significant gear tie-up, which may be manifested as a measurable drop in input shaft speed, is detected, off-going friction element D is released following a pre-calibrated force profile. Inertia phase 33 begins when off-going friction element torque capacity or control force drops to non-significant level 95. During inertia phase 33, off-going friction element slip speed rises 96 while on-coming friction element slip speed decreases 97 toward zero. The transmission input shaft speed drops as shown at 98 as the planetary gear configuration changes. During inertia phase 33, the output shaft torque 99 is primarily affected by on-coming friction element torque capacity, which is indicated by its control force 100. When on-coming friction element C becomes securely engaged at 101, the shift event completes.

In summary, a prior art methodology, which is based on an open-loop on-corning friction element control during a torque phase, cannot account for control system variability and dynamically-changing shift conditions during the torque phase, resulting in inconsistent shift feel or unpleasant shift shock. A pre-determined off-going friction element release timing with a pre-calibrated control force profile cannot ensure an optimal timing under dynamically changing shift conditions, resulting in inconsistent shift feel or unpleasant shift shock. The alternative approach to gauge off-going friction element release timing based on speed signals often results in a hunting behavior between gear tie-up and engine flair, leading to inconsistent shift feel. Furthermore, off-going friction element slip control is extremely difficult because of its high sensitivity to slip conditions. In addition, a large discontinuity exists between static and dynamic friction coefficients, introducing a large torque disturbance during an incipient slip control. A failure to achieve a seamless off-going friction element slip control during the torque phase leads to undesirable shift shock.

As can be seen from the above discussion the controllability of both off-going friction element and on-coming friction element is desirable during a torque phase in order to deliver a consistent and seamless shift quality. The prior art that depends on an open-loop approach which may be based on speed measurements does not have any solution to the problem of consistently controlling torque passing through either a multiple disc clutch or a band brake and therefore is a need in the art for a transmission control system that minimizes shift shock during a gear ratio change that does not rely solely on traditional speed signal measurement and instead relies on measured or estimated friction element load level in either a multiple plate clutch or a band brake during a torque phase of gear-ratio changing.

SUMMARY OF THE INVENTION

The present invention is directed to a closed loop shift control apparatus and method based on friction element load level that controls on-coming friction element engagement and off-going friction element release process during a torque phase of gear ratio changing from a low gear configuration to a high gear configuration for an automatic transmission system. Pressure actuated torque establishing elements define torque flow paths in transmission gearing as they are selectively engaged and released. Estimates of torsional load exerted onto an off-going friction element and estimates of on-coming friction element engagement torque are used to improve shift feel. In a first embodiment, the estimates of torsional load are used to predict an optimal off-going friction element release timing for achieving a consistent shift feel. The ideal timing to release the off-going friction element is uniquely defined when the torque load exerted onto the off-going friction element becomes zero or a near-zero level. The estimates of on-coming friction element engagement torque levels are used in a closed-loop control method to closely follow a given target trajectory for achieving a consistent shift feel.

More specifically, the method for controlling gear ratio shifts in a multiple-ratio automatic transmission is applied to an automotive vehicle powertrain. The automatic transmission includes an input torque source or input shaft, a torque output member or output shaft, gearing defining multiple torque flow paths from the input shaft to the shaft output, and first and second pressure actuated torque establishing elements for shifting from a first gear configuration with a low speed ratio to a second gear configuration with a higher speed ratio during a ratio upshift event. The upshift event has a preparatory phase, a torque phase and an inertia phase. The torque phase may be referred to as a torque transfer phase. The torque capacity of the first torque establishing element is maintained against slippage during the preparatory phase. An amount of torque load transmitted through the first torque establishing element is estimated during the torque phase.

In accordance with a preferred embodiment of the invention, measuring the amount of torque transmitted is conducted by measuring torque transmitted through the transmission input shaft, and measuring different speeds includes measuring at least two portions of the powertrain between the second torque establishing element and the set of drive wheels, then using the measured different speeds to generate the estimated torque signal. More specifically, measuring different speeds includes measuring a speed of the output shaft, measuring a speed of a first drive wheel of the set of drive wheels, and measuring a speed of a second drive wheel of the set of drive wheels, with an average speed of the measured speeds of the first and second drive wheels being determined. The estimated torque signal is generated as a function of the shaft spring constant of the output shaft times the difference between output torque member speed and the average speed of the first and second drive wheels.

In accordance with another preferred embodiment of the invention, measuring the amount of torque transmitted is conducted by measuring torque transmitted through the output shaft, and measuring different speeds includes measuring at least two portions of the powertrain between the engine and the second torque establishing element and using the measured different speeds to generate the estimated torque signal. More specifically estimating the amount of torque transmitted through the second torque establishing element is conducted by measuring engine speed and turbine speed, and the estimated torque is generated as a function of the measured engine speed and turbine speed.

The system for controlling a multiple-ratio automatic transmission for an automotive vehicle powertrain includes a first actuator for changing the torque capacity of the first torque establishing element and an estimator for determining an amount of torque transmitted through the first torque establishing element. A second actuator is provided for increasing torque capacity of the second torque establishing element. Preferably, the transmitted torque is controlled in a closed loop manner based on an estimated torque as described above. A controller maintains the torque capacity of the first torque establishing element during the torque phase until the amount of torque transmitted through the first torque establishing element drops below a predetermined amount. Thereafter, the controller decreases the torque capacity of the first torque establishing element. With this arrangement, engine flair and shift shock are reduced.

Additional objects, features and advantages of the present invention will become more readily apparent from the following detailed description of preferred embodiments when taken in conjunction with the drawings, wherein like reference numerals refer to corresponding parts in the several views.

DESCRIPTION OF PREFERRED EMBODIMENTS

Figures 1, 2:
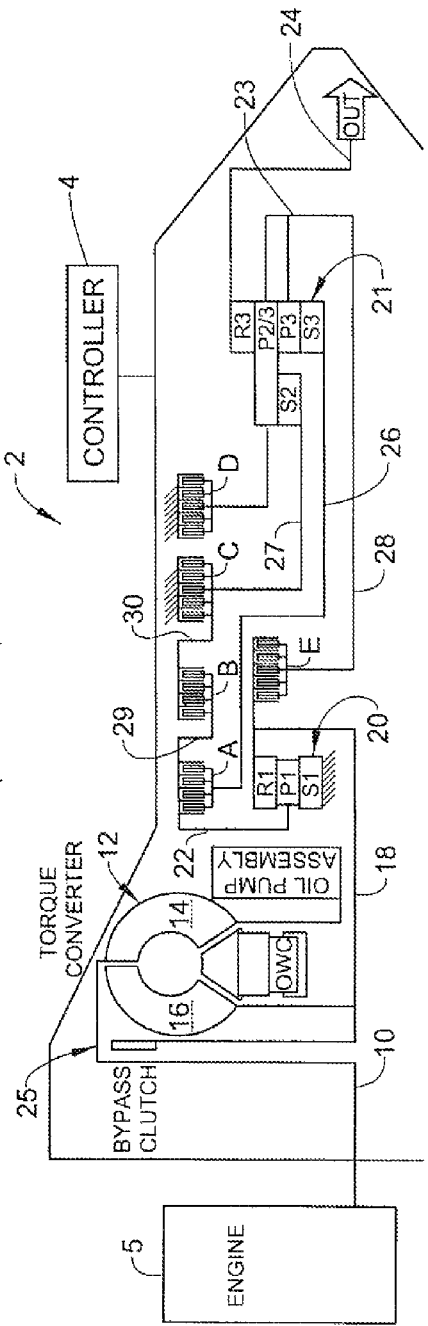
FIG. 1 is a schematic diagram of a gearing arrangement for an automatic transmission system according to the prior art.
FIG. 2 is a chart showing a clutch and brake friction element engagement and release pattern for establishing each of six forward driving ratios and a single reverse ratio for the transmission schematically illustrated in FIG. 1.
Figure 3:
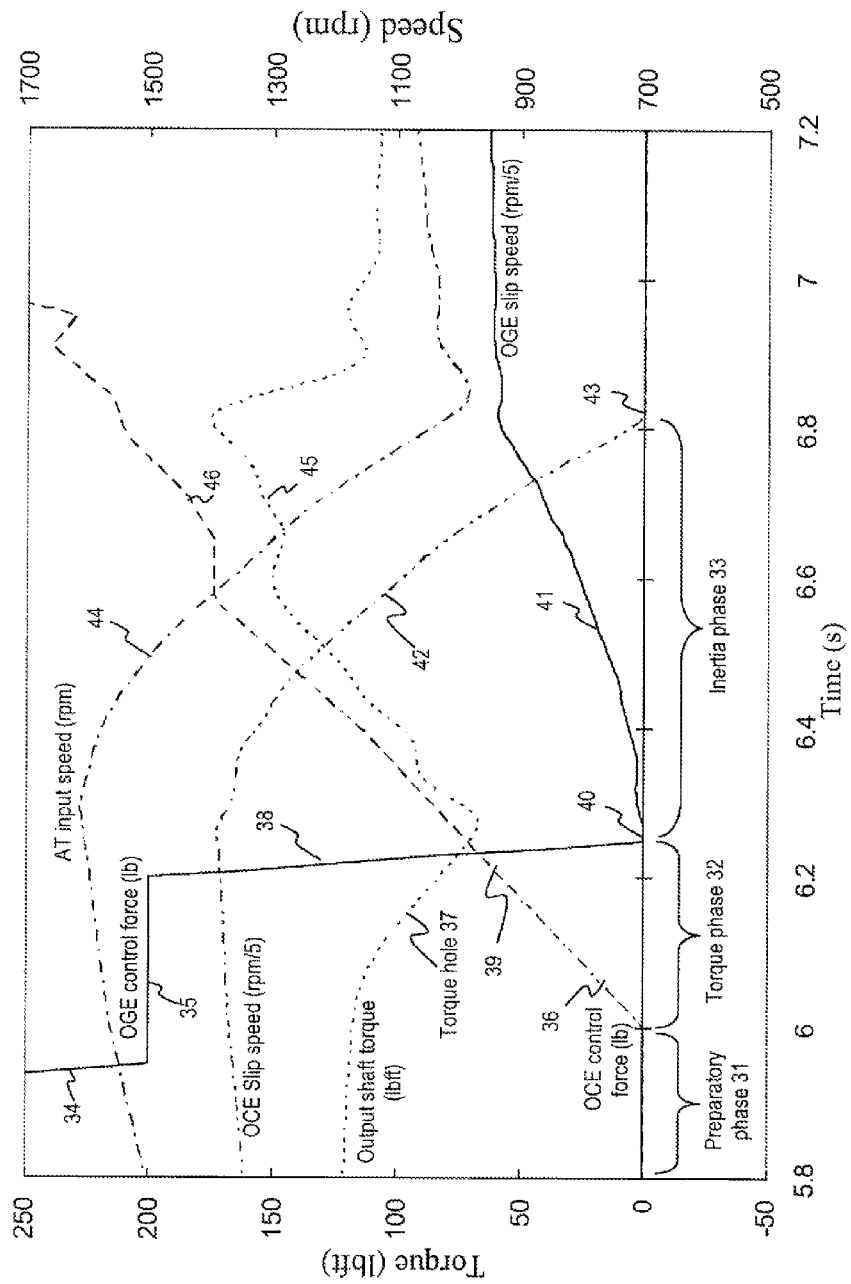
FIG. 3 is a plot of a general process of a synchronous friction element-to-friction element upshift event from a low gear configuration to a high gear configuration for the prior art automatic transmission system of FIG. 1.
Figure 4:
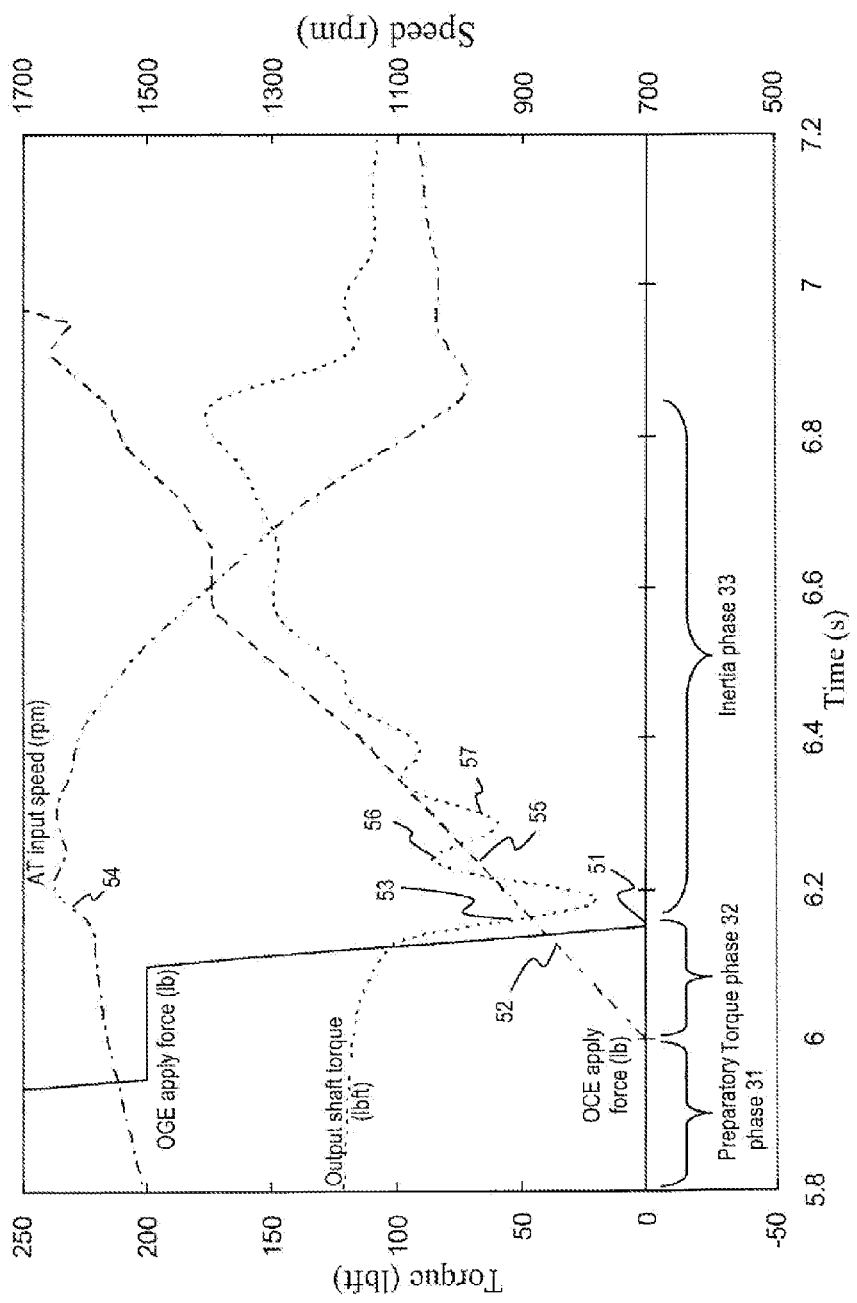
FIG. 4 is a plot of the general process of a synchronous friction element-to-friction element upshift event from the low gear configuration to the high gear configuration in which the off-going friction element is released prematurely compared with the case shown in FIG. 3.
Figure 5:
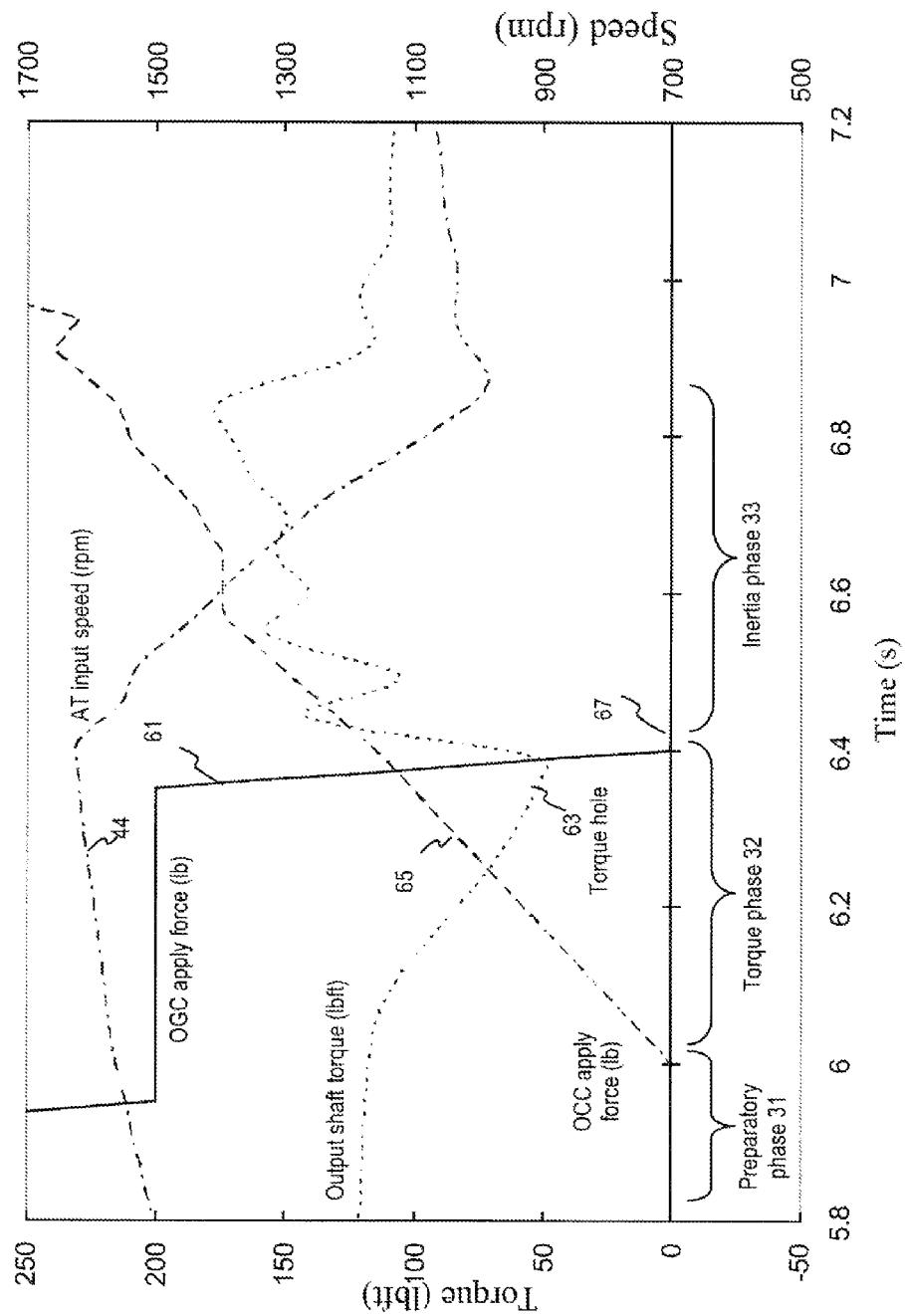
FIG. 5 is a plot of the general process of a synchronous friction element-to-friction element upshift event from the low gear configuration to the high gear configuration in which off-going friction element release is delayed compared with the case shown in FIG. 3.
Figure 6:
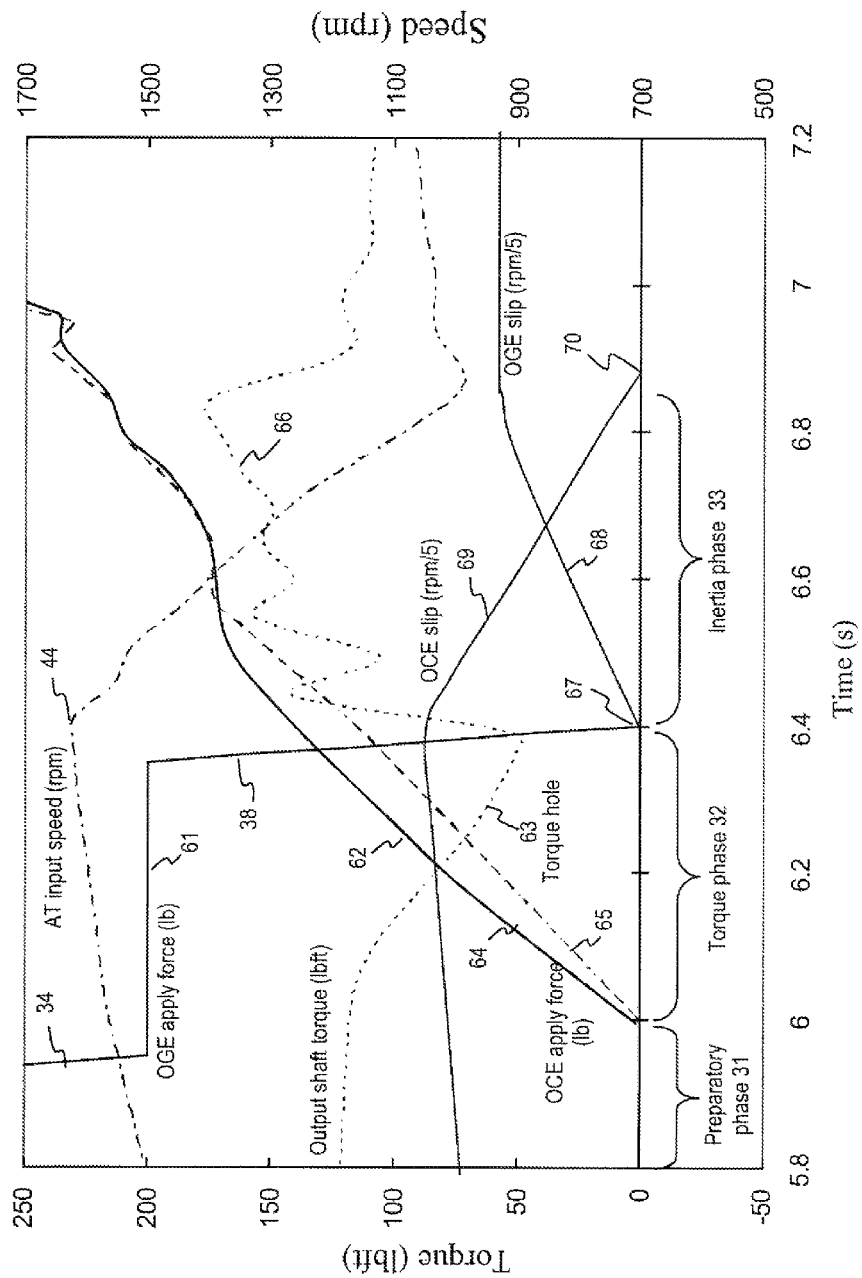
FIG. 6 is plot of a prior art synchronous friction element-to-friction element upshift control from a low gear configuration to a high gear configuration based on speed measurements of powertrain components for the automatic transmission system in FIG. 1 wherein an off-going friction element remains locked during the torque phase.
Figure 7:
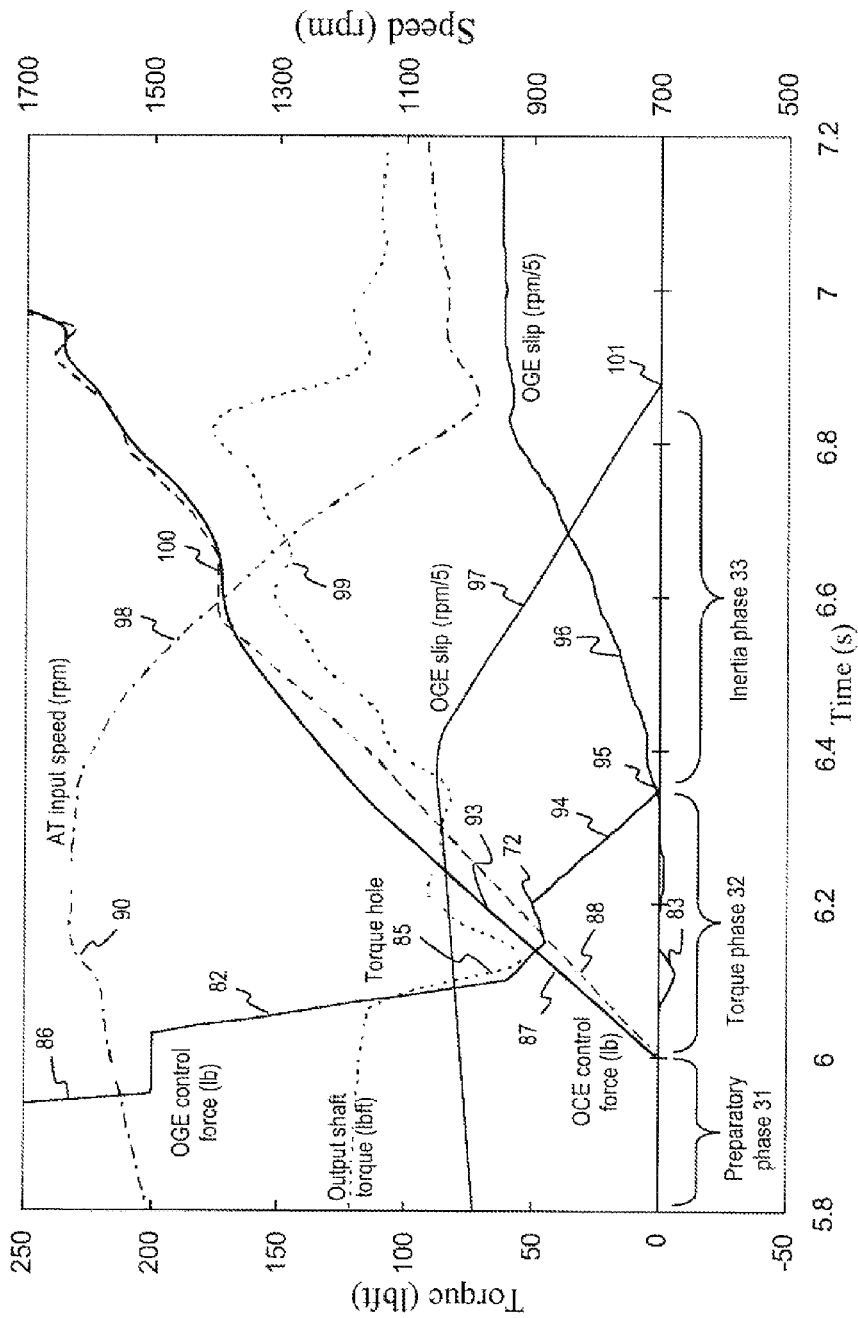
FIG. 7 is plot of a prior art synchronous friction element-to-friction element upshift control from a low gear configuration to a high gear configuration based on speed measurements of powertrain components for the automatic transmission system in FIG. 1, wherein an off-going friction element is slipped during the torque phase.
Figure 8:
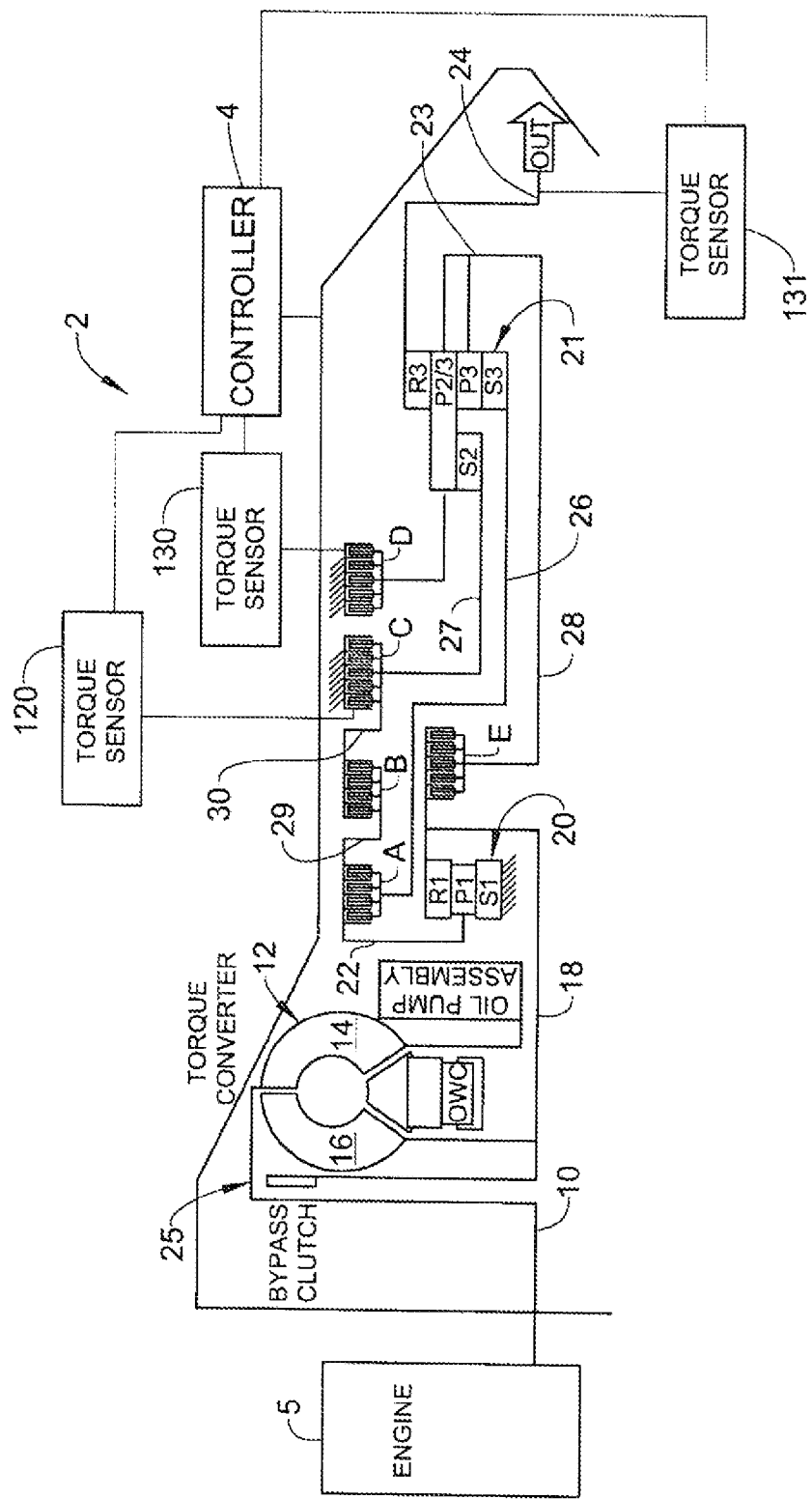
FIG. 8 is a schematic diagram of a gearing arrangement for an automatic transmission system including load sensor locations in accordance with a first preferred embodiment of the invention.

With initial reference to FIG. 8, there is shown an automotive transmission employing the invention. As this automatic transmission arrangement is similar to the one schematically illustrated in FIG. 1, all the same parts have been indicated with corresponding reference numbers and therefore a duplicate discussion of these parts will not be made here. Instead, of particular importance is the addition of a torque sensor 120 located in friction element C, a load sensor 130 located in friction element D, and a torque sensor 131 located in transmission output shaft 24, all connected to controller 4 for controlling various functions of transmission 2 as will be more fully discussed below.

Figure 8A:
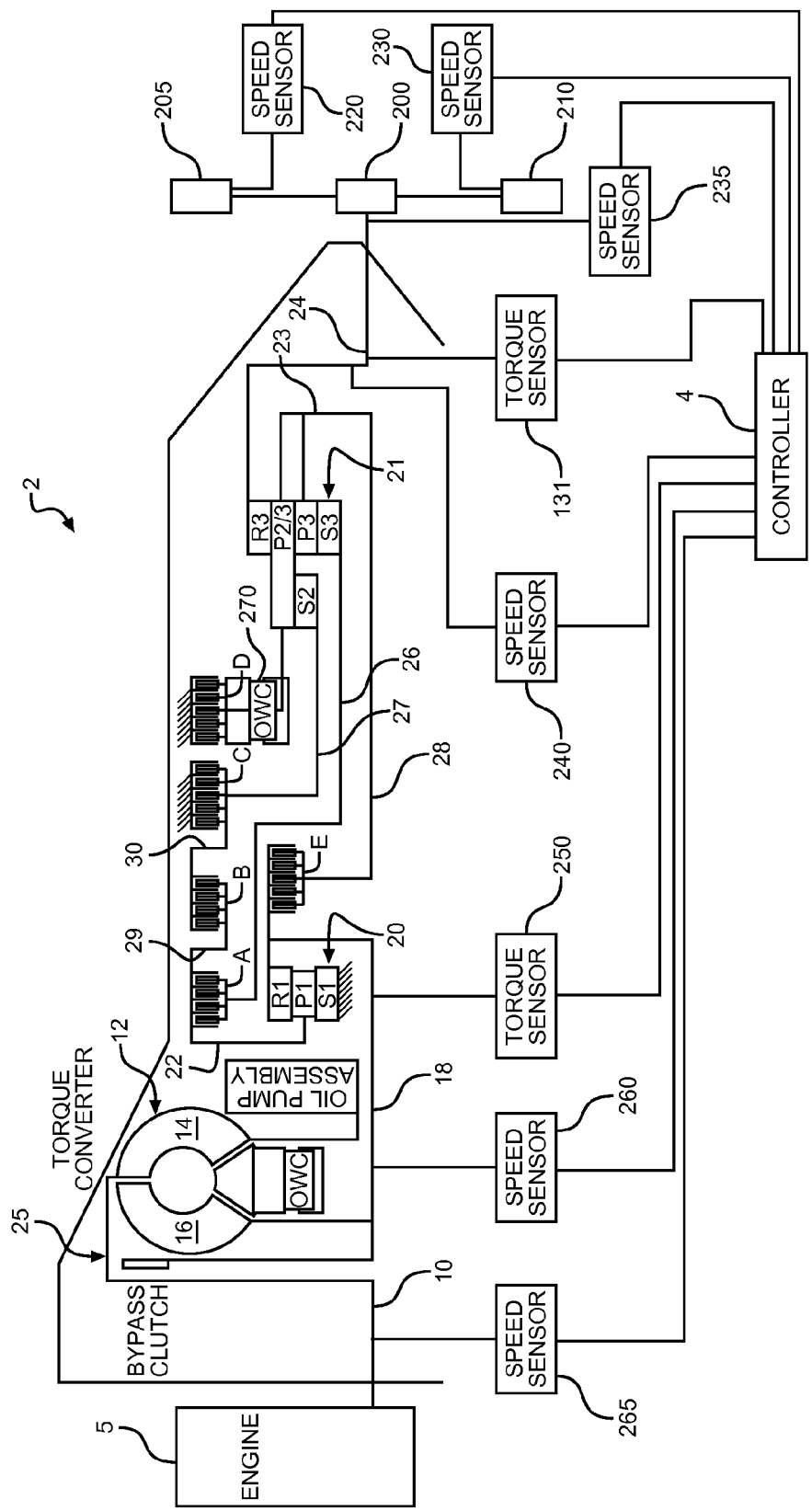
FIG. 8A is a schematic diagram of a gearing arrangement for an automatic transmission system including numerous torque and speed sensor locations.

FIGS. 8A-8D also show additional automotive transmissions employing the invention. As these automatic transmission arrangements are similar to the one schematically illustrated in FIG. 8, all the same parts have been indicated with corresponding reference numbers and, therefore, a duplicate discussion of these parts will not be made here. While FIG. 8 shows an arrangement for directly measuring torque loads of the friction elements, FIGS. 8A-8D show arrangements for estimating torque loads of the friction elements. Of particular importance, as best seen in FIG. 8A, is the addition of a differential 200 connecting output shaft 24 to first and second drive wheels 205, 210. Speed sensors 220, 230 are provided to measure the speed of the first and second drive wheels 205, 210 respectively. From these speed sensors 220, 230, an average wheel speed $\omega_w$ may be determined. Alternatively average wheel speed $\omega_w$ may be determined from a single speed sensor 235 located upstream of differential 200. In addition, a speed sensor 240 is provided to measure the speed $\omega_{OS}$ of output shaft 24; a torque sensor 250 is provided to measure the torque $T_{IS}$ of input shaft 18; a speed sensor 260 is provided to measure the speed $\omega_{OS}$ of input shaft 18; a speed sensor 265 is provided to measure the speed $\omega_E$ of engine 5; and, like the FIG. 8 embodiment, torque sensor 131 measures the torque $T_{OS}$ of output shaft 24. Also note that off-going friction element D includes the addition of an optional one-way clutch 270 for performing non-synchronous shifts.

Figure 8B:
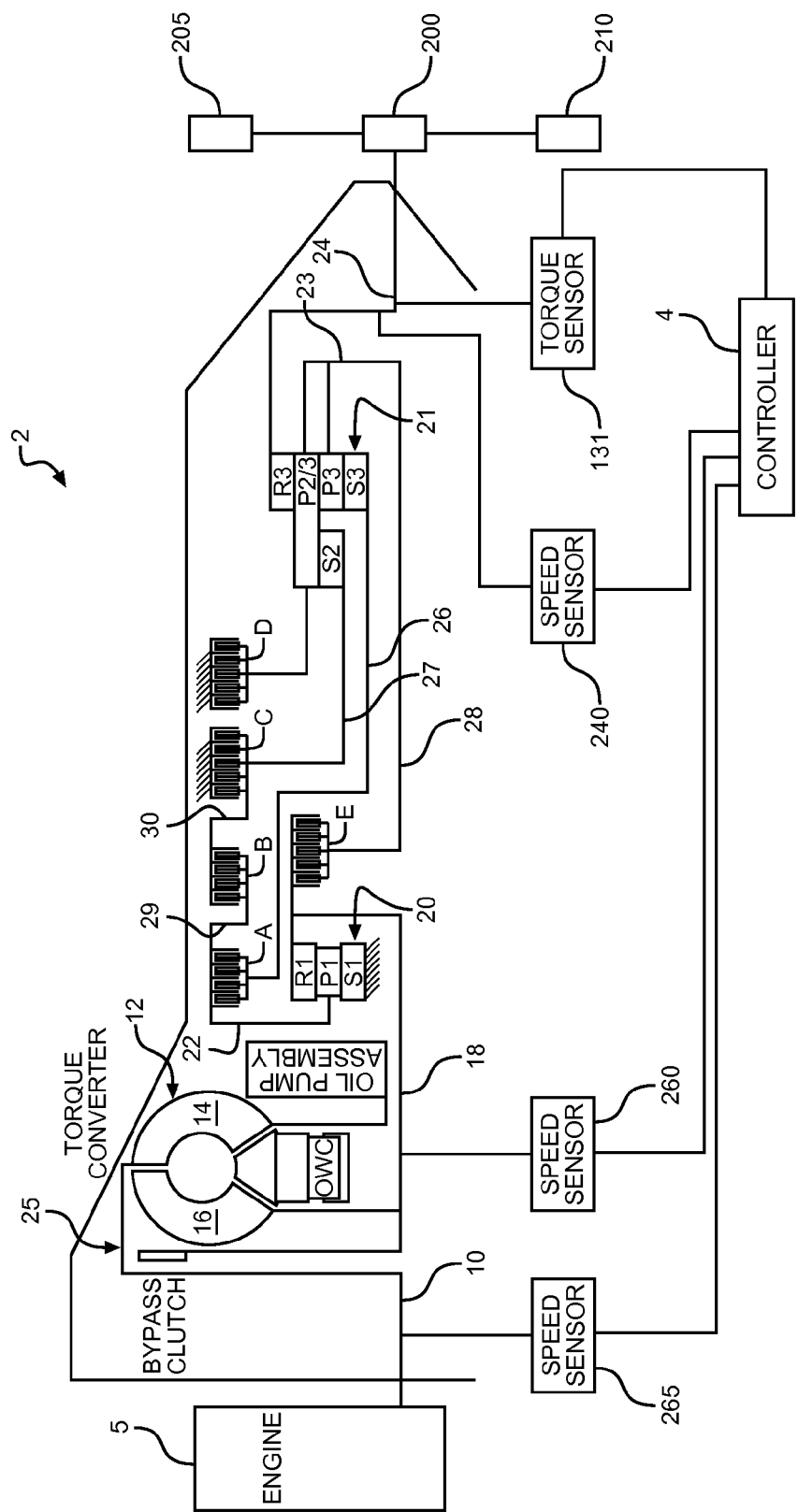
FIG. 8B is a schematic diagram of a gearing arrangement for an automatic transmission system including torque and speed sensor locations wherein the transmission input shaft torque is estimated and a output shaft speed is measured directly.
Figure 8C:
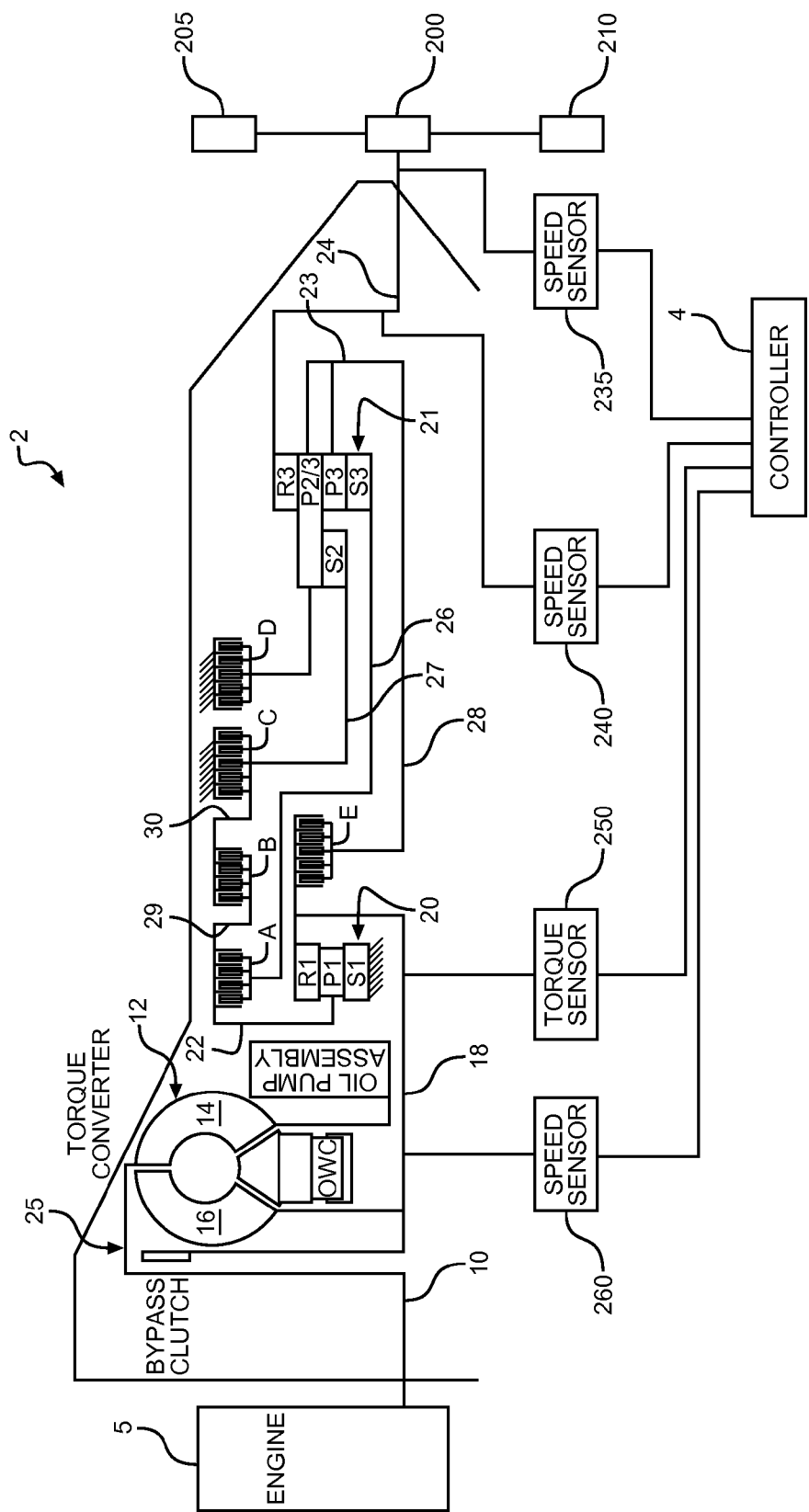
FIG. 8C is a schematic diagram of a gearing arrangement for an automatic transmission system including torque and speed sensor locations wherein the transmission output shaft torque is estimated and a output shaft speed is measured directly.
Figure 8D:
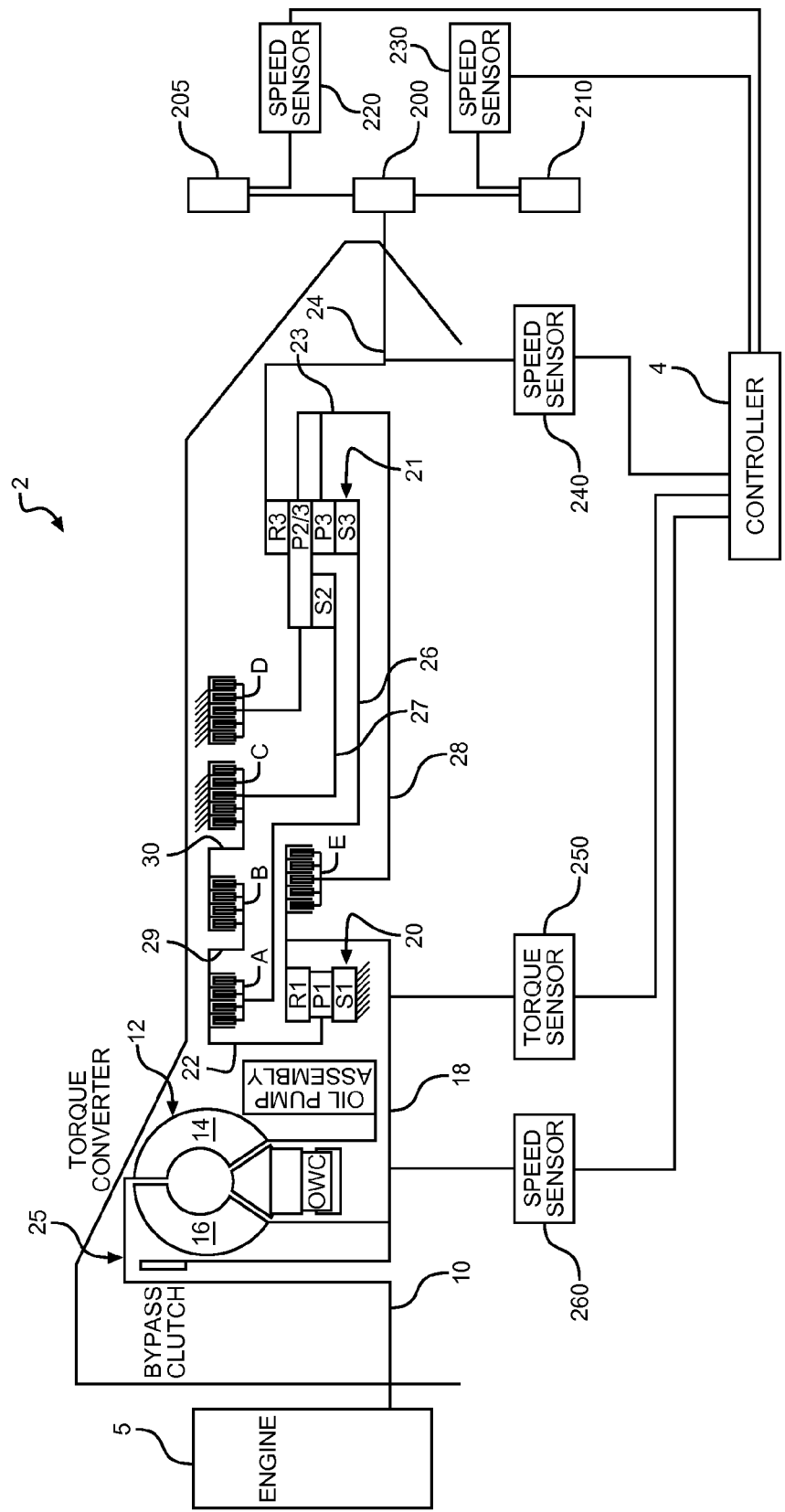
FIG. 8D is a schematic diagram of a gearing arrangement for an automatic transmission system including torque and speed sensor locations wherein the transmission output shaft torque is estimated and a output shaft speed is measured with wheel speed sensors.

FIG. 8B is a schematic diagram of a gearing arrangement for an automatic transmission system wherein the transmission input shaft torque $T_{IS}$ is estimated from the speed $\omega_{IS}$ of input shaft 18 as measured by sensor 260 and the speed $\omega_E$ of engine 5 as measured by speed sensor 265; and an output shaft torque $T_{OS}$ is measured directly with torque sensor 131. FIGS. 8C and 8D show another preferred embodiment wherein the transmission input shaft torque $T_{IS}$ is measured with torque sensor 250; and the output shaft torque $T_{OS}$ is estimated from the speed $\omega_{OS}$ of output shaft 24 as measured by speed sensor 240 and average wheel speed $\omega_w$ measured either by speed sensor 235 as shown in FIG. 8C or by speed sensors 220 and 230 as shown in FIG. 8D. With the arrangement of FIG. 8D, existing sensors, such as wheel speed sensors used for other vehicle control routines, may be used, thus not increasing the overall cost of the vehicle.

Figure 9:
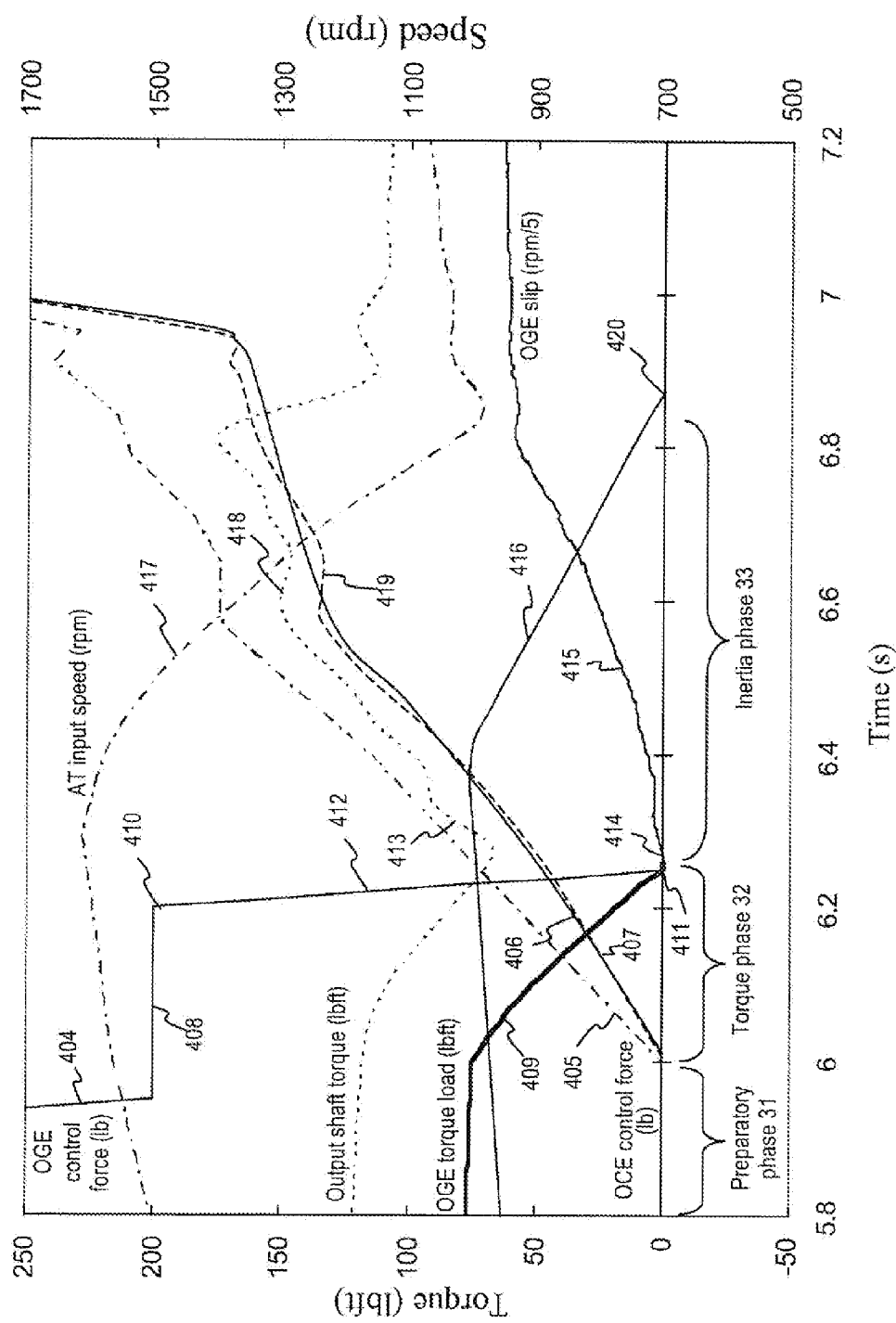
FIG. 9 is a plot of a synchronous friction element to friction element upshift control from a low gear configuration to a high gear configuration for the automatic control system in FIG. 8 based on direct measurements or estimates of torsional load exerted onto an off-going friction element in accordance with a preferred embodiment of the invention.

FIG. 9 shows a torque phase control method according to a preferred embodiment of the invention for a synchronous friction element-to-friction element upshift from a low gear configuration to a high gear configuration for the automatic transmission system in FIG. 8. The on-coming friction element control method illustrated here is also applicable to non-synchronous shift control. The shift event is divided into 3 phases: preparatory phase 31, torque phase 32 and inertia phase 33. During preparatory phase 31, an on-coining friction element piston is stroked to prepare for its engagement. At the same time, off-going friction element control force or its torque capacity is reduced as shown at 404 as a step toward its release. During torque phase 32, on-coming friction element control force is raised in a controlled manner as shown at 405. More specifically, controller 4 commands on-coming friction element actuator to follow a target on-coming friction element engagement torque profile 406 through a closed-loop control directly based on the measurements of on-coming friction element engagement torque 407 during torque phase 32. On-coming friction element torque 407 may be directly measured using a load sensor according to this invention as more fully described in U.S. patent application Ser. No. 12/421,339 filed on Apr. 9, 2009, which is fully incorporated herein by reference. On-coming friction element engagement torque directly affects transmission output torque that is transmitted to the vehicle wheels. This torque-based close-loop control eliminates or significantly reduces the undesirable effects of on-corning friction element engagement torque sensitivity to hardware variability and shift conditions, achieving a consistent shift feel, regardless of shift conditions.

Alternatively to the direct measurements, on-coming friction element torque can be determined from the measurements of transmission output shaft torque using torque sensor 131 depicted in FIG. 8. Mathematically, on-coming friction element torque $T_{OCE}$ can be described as a function of measured output shaft torque $T_{OS}$ as:

$$T_{OCE}(t) = G_{OCE} T_{OS}(t) \quad \text{Eq. (1)}$$

Where $G_{OCE}$ can be readily obtained based on a given gear set geometry.

Alternatively, on-coming friction element torque $T_{OCE}$ can be estimated through the following Eq. (2), based on a slight change in transmission component speeds $\omega_i$ at pre-determined locations (i=1, 2, . . . , n), $$T_{OCE}(t) = F_{trans}(\omega_i, t) \quad \text{Eq. (2)}$$

where t indicates time and $F_{trans}$ represents a mathematical description of a transmission system. More specifically, as on-corning friction element engagement torque rises 407, torque levels transmitted through various transmission components change. This creates small, but detectable changes in $\omega_i$. A transmission model, $F_{trans}$, can be readily derived to estimate on-coming friction element engagement torque when off-going friction element remains locked during torque phase 32.

A way to estimate the on-coming element torque throughout a shift (during all phases), is to use an arrangement such as that shown in FIG. 8A. Specifically, output shaft torque $T_{OS}$, output shaft speed $\omega_{OS}$, input shaft or turbine speed $\omega_{IS}$, and input shaft torque $T_{IS}$ are all measured. On-coming element torque $T_{OCE}$ is calculated with Equation 3, where $GR_{old}$ and $GR_{new}$ are the gearbox ratio in the old and the new gear respectively. $I_{IS}$ and $I_{OS}$ are the effective inertias at the input and output of the gearbox. $C_{OCE}$ our and $C_{OCE\_IN}$ are the ratios between the torque at the on-coming element C to the torque at the output and the input shafts respectively. The C ratios depend only on the geometry of the transmission.

$$T_{OCE} = \frac{T_{OS} + I_{OS}\dot{\omega}_{OS} - GR_{old}(T_{IS} - I_{IS}\dot{\omega}_{IS})}{C_{OCE\_OUT} - GR_{old}C_{OCE\_IN}} \quad \text{Eq. (3)}$$

Yet, another way to estimate the on-coming element torques is to use an arrangement such as that shown in FIG. 8B. Specifically, the output shaft torque $T_{OS}$, the output shaft speed $\omega_{OS}$, the input shaft or turbine speed $\omega_{IS}$, and the crank shaft or engine speed $\omega_E$ are all measured. The input shaft or turbine torque $T_{IS}$ is estimated as a function of the input shaft or turbine speed $\omega_{IS}$ and the engine speed $\omega_E$ and used in Equation 3. For example, equation 4 may be used to find turbine torque $T_{IS}$ where K and TR are nonlinear functions of speed ratio across the torque converter.

$$T_{IS} = \left[\frac{\omega_E}{K(\omega_{IS}/\omega_E)}\right]^2 TR(\omega_{IS}/\omega_E) \qquad \text{Eq. (4)}$$

Another way to estimate on-coming element torques is to use an arrangement such as that shown in FIGS. 8C and 8D. Specifically, the input shaft or turbine torque $T_{IS}$, the output shaft speed $\omega_{OS}$, and the average wheel speed $\omega_w$ all measured. The output shaft torque $T_{OS}$ is estimated as a function of an output shaft spring constant $K_s$, the output shaft speed $\omega_{OS}$ and the average wheel speed $\omega_w$ and used in Equation 3. For example, the equation 5 may be used to find the time derivative of torque $\dot{T}_{OS}$ and then torque $T_{OS}$ may be found by integration $R_d$ is a final drive ratio constant.

$$\dot{T}_{OS} = K_s(\omega_{OS} - R_d\omega_w) \qquad \text{Eq. (5)}$$

Controller 4 commands enough off-going friction element control force 408 to keep the off-going friction element from slipping, maintaining the planetary gearset in the low gear configuration during torque phase 32. As on-coming friction element engagement torque 407 increases, a reaction torque goes against a component (not labeled) that is grounded to a transmission case. More specifically, in this case, torque transmitted through off-going friction element or torsional load 409 exerted onto off-going friction element D decreases proportionally. Off-going friction element load level 409 can be directly monitored using a torque sensor as more fully described in U.S. patent application Ser. No. 12/421,339. Alternatively, off-going friction element load level $T_{OGE}$ 409 can be calculated from Equation 6 below where $C_{OCE\_OUT}$ and $C_{OCE\_IN}$ are the ratios between the torque at off-going element D to the torque at the output and the input shaft respectively.

$$T_{OGE} = \frac{T_{OS} + I_{OS}\dot{\omega}_{OS} - GR_{new}(T_{IS} - I_{IS}\dot{\omega}_{IS})}{C_{OGE\_OUT} - GR_{new}C_{OGE\_IN}} \qquad \text{Eq. (6)}$$

According to this invention, off-going friction element D is released at an ideal timing when torque load exerted onto off-going friction element D becomes zero or a near-zero level. Transmission controller 4 initiates a release process of off-going friction element D as shown at 410 as off-going friction element load 409 approaches zero at 411. Off-going friction element torque is dropped quickly as shown at 412 with no slip control. Since no off-going friction element slip control is involved, the method is insensitive to off-going friction element break-away friction coefficient variability. In addition, the quick release of off-going friction element D shown at 412 induces little disruption in output shaft torque at 413 because off-going friction element load level is near zero as shown at 411 at the moment of release. Off-going friction element D starts slipping 411 once its control force reaches a non-significant level. During inertia phase 33, a conventional control approach may be utilized based on on-coming friction element slip measurements. Off-going friction element slip speed increases as shown at 415 while on-coming friction element slip speed decreases as shown at 416. The transmission input speed drops as shown at 417 as the planetary gear configuration changes. During inertia phase 33, output shaft torque 418 is primarily affected by on-coming friction element torque level 419. Alternatively to the conventional control, a closed loop control that is based on measured or estimated on-corning friction element torque may continue to be employed. When on-coming friction element C completes engagement or when its slip speed becomes zero as shown at 420, the shift event completes.

Figure 10:
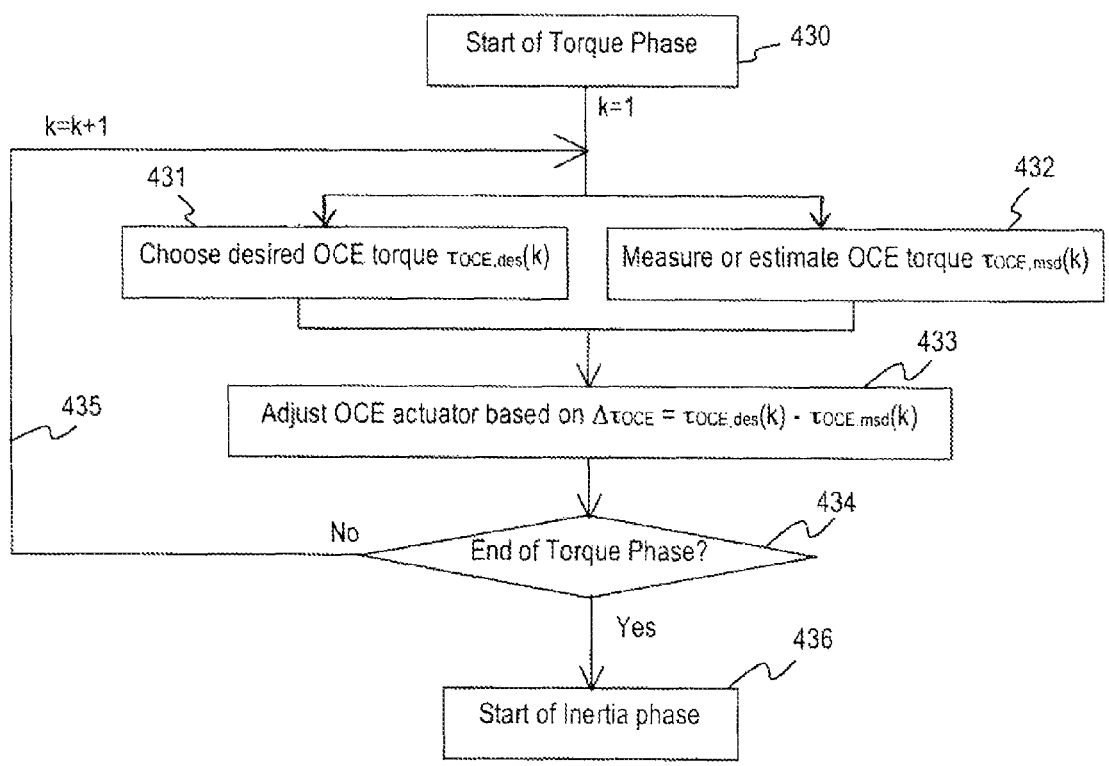
FIG. 10 is a flow chart showing an on-corning friction element control method in accordance with a preferred embodiment of the invention.

FIG. 10 shows a flow chart of closed-loop on-coming friction element engagement torque control during the torque phase depicted in FIG. 9. Step 430 is the beginning of torque phase 32. Controller 4 chooses a desired on-coming element torque at step 431 and measures or estimates an actual torque at step 432. At step 433, the on-coming friction element actuator is then adjusted by controller 4 based on the difference between the measured/estimated torque level and the actual torque level. At step 434, controller 4 determines if torque phase has ended and if so controller 4 starts inertia phase 33 at 436.

Figure 11:
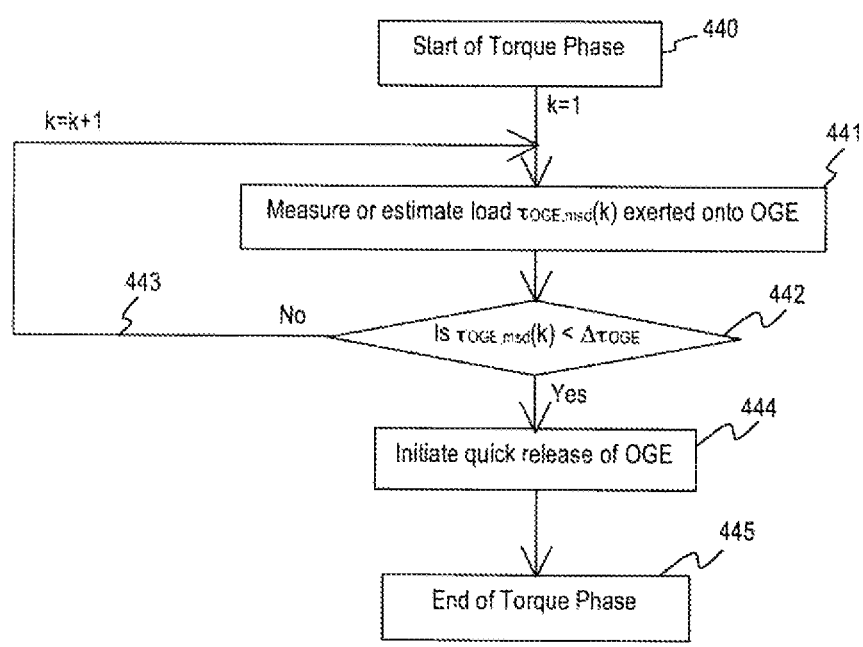
FIG. 11 is a flow chart showing an off-going element release control method in accordance with a preferred embodiment of the invention.

FIG. 11 shows a flow chart of an off-going friction element torque control process during torque phase 32 depicted in FIG. 9. The process starts at step 440 at the beginning of torque phase 32. A load transmitted through locked off-going friction element D is directly measured or estimated at step 441. At step 442, when its load level drops below a predetermined level, off-going friction element D is promptly released at step 444. The control process ends at step 445 at the end of torque phase 32.

Figure 12:
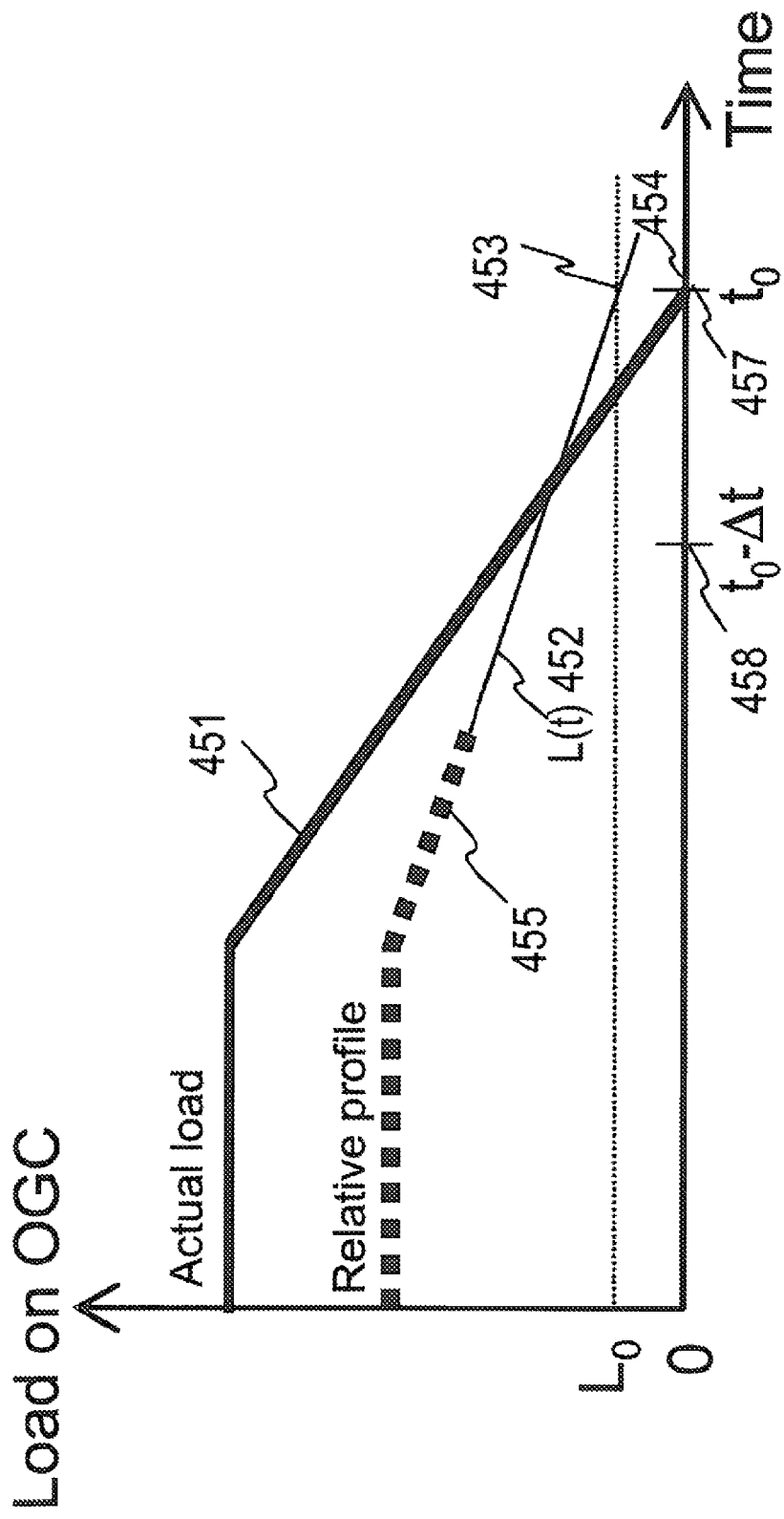
FIG. 12 is a plot of the process used to determine an ideal release timing of the off-going friction element in accordance with first preferred embodiment of the invention.

Alternatively to the measurements or estimates of absolute load levels, FIG. 12 illustrates the process to determine the ideal release timing of off-going friction element D based on relative load measurements or estimates according to this invention, FIG. 12 depicts an actual load profile 451 exerted on off-going friction element D and a relative load profile L(t) 452 measured by torque sensor 130 during the upshift event in FIG. 9. The preferred embodiment requires only relative load profile L(t) 452. Relative load profile L(t) 452 is preferably constructed from uncalibrated sensor output that reflects actual load profile 451, but not its absolute levels. This feature eliminates the need of a full sensor calibration across the entire load range. It also makes the preferred embodiment insensitive to sensor output drift over time. However, the preferred embodiment relies on knowledge of sensor measurement $L_0$ 453 which corresponds to zero off-going friction element load level 454. Sensor measurement $L_0$ 453 can be readily identified, as often as required, by sampling sensor output while vehicle transmission 2 is in a neutral or a similar condition where no load is exerted onto off-going friction element D. Transmission controller 4 collects relative load data 455 during torque phase 32 to dynamically construct relative load profile L(t) 452. Then, controller 4 extrapolates L(t) to predict $t_0$ 457 where $L(t_0)=L_0$. Once $t_0$ 457 is obtained in advance, controller 4 predicts when to initiate an off-going friction element release process. Specifically, controller 4 starts the release process at a time equal to $t_0-\Delta t$ shown at 458, where $\Delta t$ is the time required to quickly drop off-going friction element control force to zero. In this way, off-going friction element D starts slipping at or near ideal timing $t_0$ 457 when the actual off-going friction element load level is at or close to zero as shown by reference numeral 454.

Figure 13:
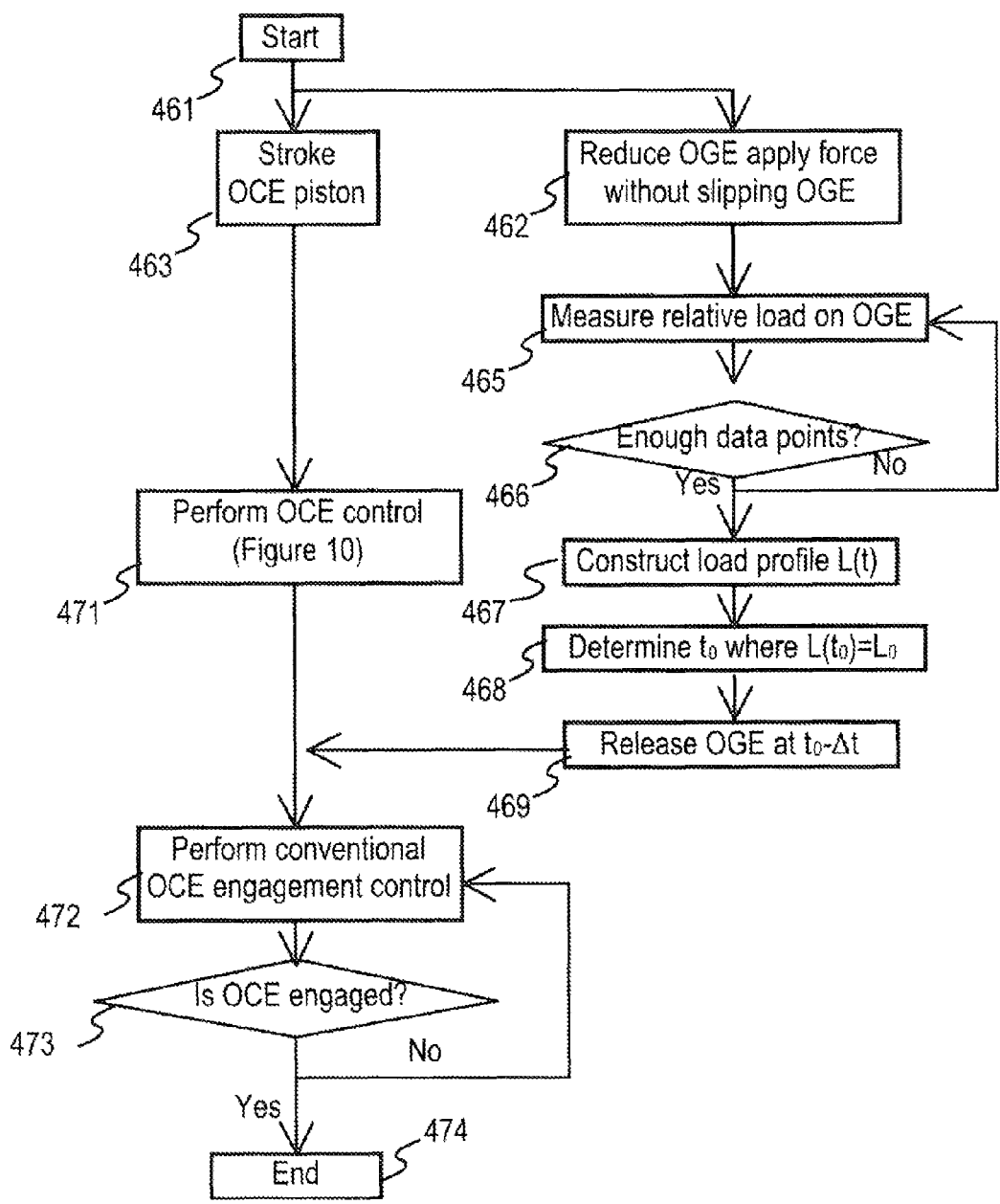
FIG. 13 is a flow chart showing a shift control method in accordance with a preferred embodiment of the invention.

FIG. 13 presents a flow chart of the new upshift control method according to this invention. During preparatory phase 31 at step 461 of a synchronous upshift event, off-going friction element torque capacity or apply force is reduced to a holding level without allowing any slip at step 462 while on-corning friction element piston is stroked at step 463. During torque phase 32, transmission controller 4 measures at step 465 a relative load level exerted onto off-going friction element D at a pre-specified sampling frequency using torque sensor 130 described further below. Controller 4 repeats this measurement step 465 until enough data points are collected at step 466 for dynamically constructing a relative load profile at step 467 that shows load as a function of time L(t). Once relative load profile L(t) is obtained, controller 4 predicts the ideal off-going friction element release timing $t_0$ at step 468 so that $L(t_0)=L_0$ where $L_0$ corresponds to a substantially zero load level on off-going friction element D. Controller 4 initiates an off-going friction element release process at $t_0-\Delta t$ as shown as step 469 where $\Delta t$ is a pre-specified time required to quickly drop off-going friction element apply force to zero. Alternatively, controller 4 may initiate the off-going friction element release process at $t_{thres}$ such that $L(t_{thres})=L_{thres}$ where $L_{thres}$ is a predetermined threshold. No slip control is required for off-going friction element D during torque phase 32. Inertia phase 33 starts when off-going friction element D is released. The control methodology illustrated in FIG. 10 is preferably applied to on-coming friction element C during torque phase 32. A conventional on-coming friction element control may be applied during inertia phase 33 based on speed signals. When on-coming friction element C becomes securely engaged at step 473, the shift event completes at step 474.

Figure 14:
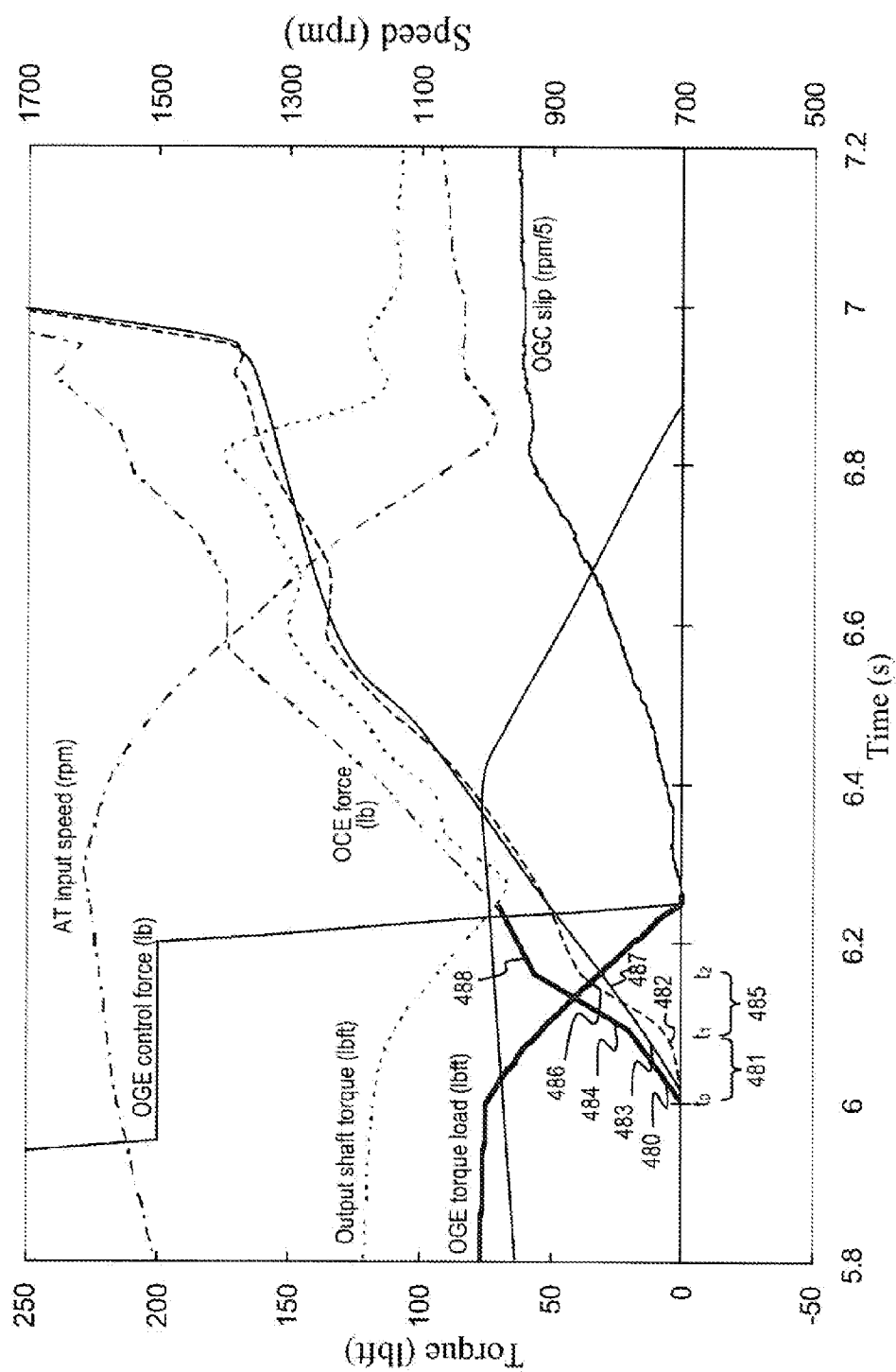
FIG. 14 is a plot of a synchronous friction element-to-friction element upshift from a low gear configuration to a high gear configuration for the automatic transmission control system in FIG. 8 based on the direct measurements or estimates of torsional load exerted onto an off-going friction element and an on-coming element in accordance with another preferred embodiment of the invention.

FIG. 14 illustrates another preferred embodiment of the invention relating to a transmission system with an on-coming friction element actuator which may not have a sufficient control bandwidth compared with a sampling time of load measurements. At the beginning of torque phase 32, a transmission controller raises on-coming friction element actuator force based on a pre-calibrated slope 480 over a time interval $\Delta t$ between $t_0$ and $t_1$ as shown at interval 481. During interval 481, on-coming friction element load is either measured or estimated with a sampling time finer than $\Delta t$ to construct an engagement torque profile 482. If the measured or estimated torque profile 482 indicates a slow rise compared with a target torque profile 483, controller 4 increases a slope of commanded on-coming friction element control force for a next interval 485 between $t_1$ and $t_2$. On the other hand, if the actual torque is rising faster than a target profile, controller 4 reduces a slope of commanded on-coming friction element control force. For example, during interval 485 between $t_1$ and $t_2$, on-coming friction element load is either measured or estimated with a sampling time finer than $\Delta t$ to construct an engagement torque profile 486. The measured or estimated slope 486 of the engagement torque is compared against a target profile 487 to determine a slope 488 of commanded force profile for the following control interval. This process is repeated until the end of torque phase 32. The off-going friction element release control remains the same as that shown in FIG. 9.

Figure 15:
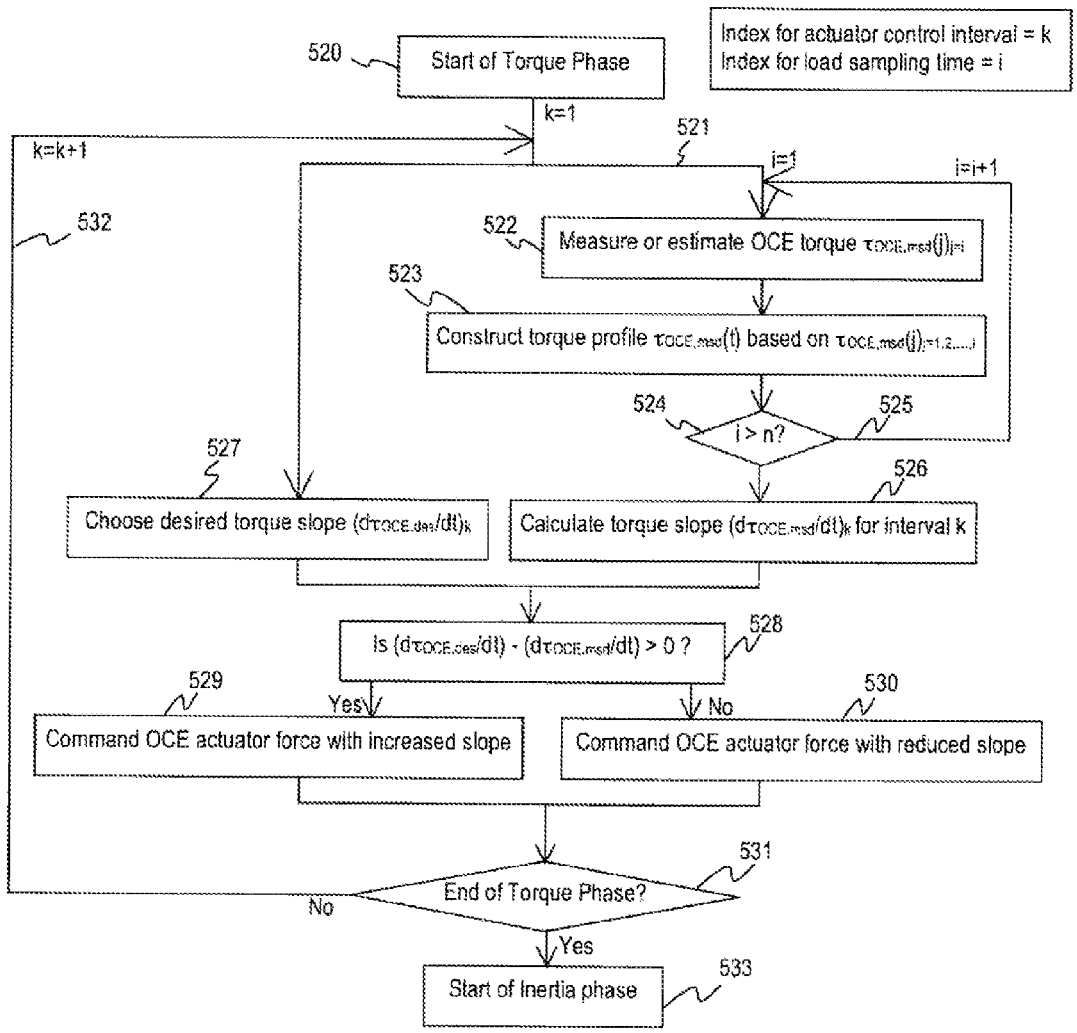
FIG. 15 is a flow chart showing an on-coming friction element shift control method in accordance with another preferred embodiment of the invention.

FIG. 15 shows a flow chart of alternative closed-loop on-coming friction element engagement torque control during torque phase depicted in FIG. 14. The start of torque phase 32 is shown at step 520. Following path 521, the off-coming friction element torque is measured or estimated at step 522 and torque profile 482 is created therefrom at step 523. The method may have to go through several iterations as shown by decision block 524 and return loop 525. Torque slope profile 486 or an average derivative of torque profile 482 is calculated at 526 and while a desired target slope profile 487 is calculated at 527 and compared with torque slope profile 486 at 528. The actuator force slope is increased 529 or decreased 530 and the process continues 531, 532 until the end of torque phase 32. The process then proceeds to inertia phase 33 at 533.

Figure 16:
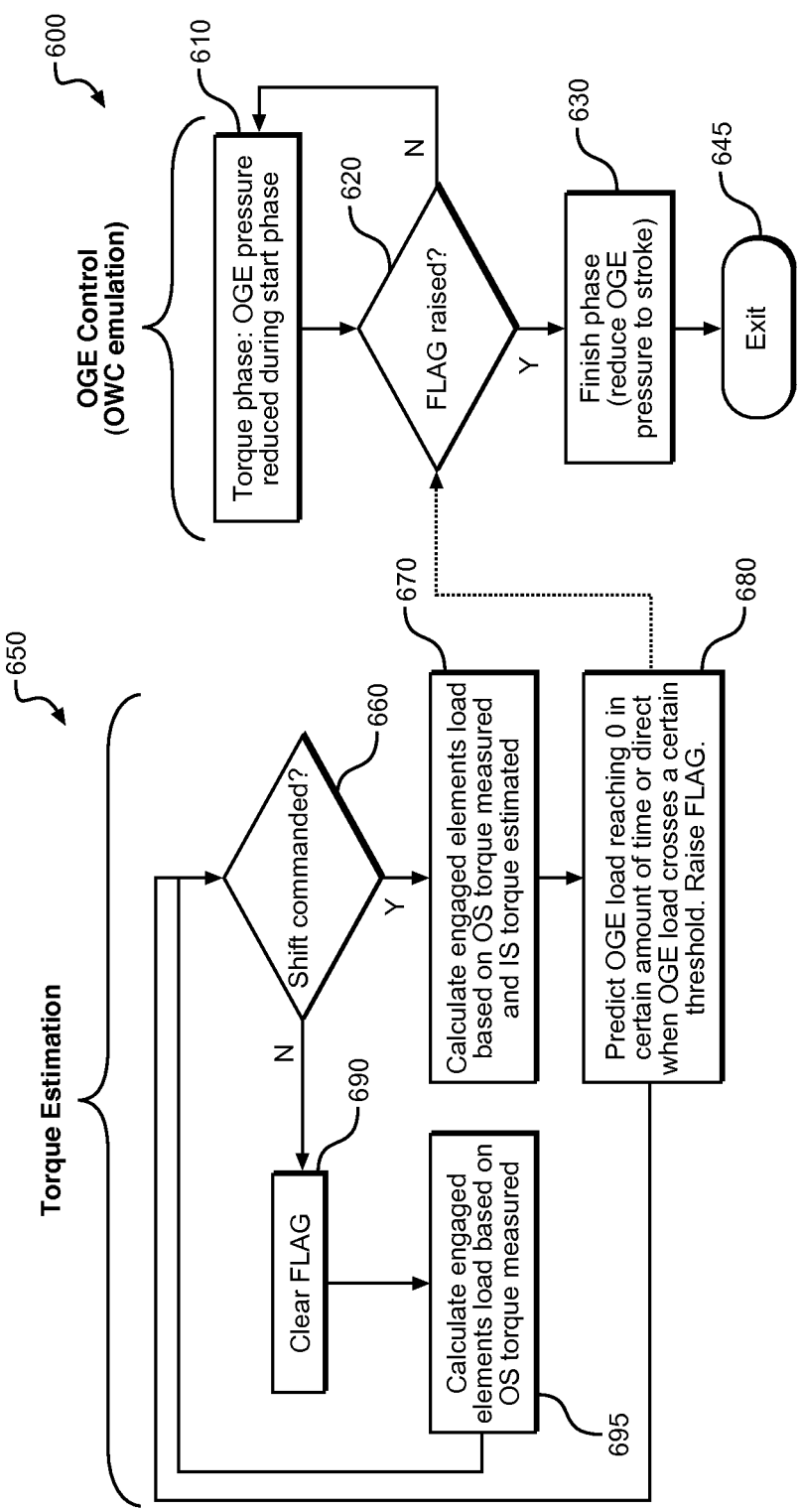
FIG. 16 is a flow chart showing a friction element shift control method in accordance with another preferred embodiment of the invention.

FIG. 16 shows a flowchart depicting various steps in a control strategy employed during a power on upshift using clutch torque estimation. The right side of FIG. 16 shows the control routine 600 for an off-going friction element emulating a one-way clutch. The control strategy starts at 610 in a torque phase. During the torque phase, the off-going element's pressure is reduced. Next, at step 620, the process checks to see if a flag has been raised indicating if the off-going element's load has either reached zero or crossed a threshold. If the flag has not been raised, the strategy stays in the torque phase, otherwise the strategy proceeds to reduce the off-going element's pressure at 630. The strategy ends at 645 where other shifting control strategies may be employed. The left side of FIG. 16 shows a control loop 650 that is used for torque estimation. If a shift is commanded at 660 then loads on the engaged elements are calculated based on measured output shaft torque and estimated input shaft at 670. Next at 680 the strategy predicts how much time it will take for the off-going element's load to reach zero or detect when the off-going element's load will cross a certain threshold and a flag is raised as discussed above. If a shift is not commanded at 660 then a flag is cleared at 690 and the load on the engaged elements is calculated based on measured output shaft torque at 695.

Figure 17:
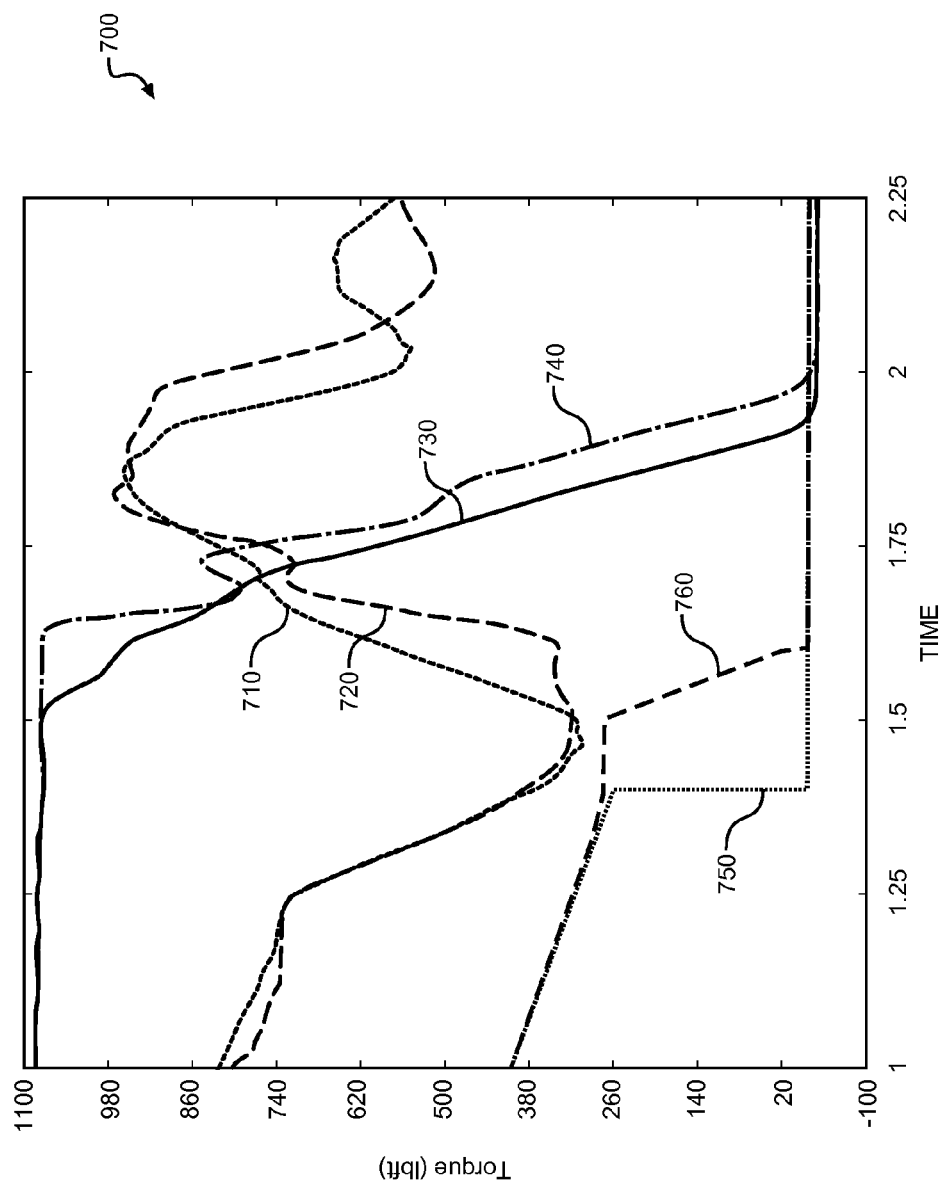
FIG. 17 is a plot comparing a process using a friction element to friction element upshift control from a low gear configuration to a high gear configuration using a one-way clutch to a process using a friction element to friction element upshift control from a low gear configuration to a high gear configuration with a control method simulating a one-way clutch in accordance with the invention.

FIG. 17 shows is a plot 700 comparing a process using a friction element to friction element upshift control from a low gear configuration to a high gear configuration to a process using a friction element-to-friction element upshift control from a low gear configuration to a high gear configuration with a control method simulating a one-way clutch. In a non-synchronous shift, the off-going friction elements is replaced with a one-way clutch. Such a shift has a constantly good shift feel but requires more hardware and is thus expensive to implement. The current invention allows for such a shift to be simulated, thus receiving the benefits of a one-way clutch without the extra cost. In other words the invention allows for simulation of the non-synchronous shift behavior with synchronous hardware and simulation of a one-way clutch function with no one-way clutch. Such a benefit may be seen with reference to plot 700, which shows drive shaft torque 710 as a function of time from a one-way clutch simulation as compared to drive shaft torque 720 as a function of time without simulation. Also shown is a value for the ratio of input transmission speed to output transmission speed both with and without one-way clutch simulation as shown at 730 and 740 respectively. In the case of the ratio of input transmission speed to output transmission speed, a smooth curve is considered desirable. This curve represents the change of speed ratio during the inertia transfer phase of the shift. The smoother this ratio change occurs, the less disturbance to output shaft speed and torque occurs and therefore there is less disturbance to vehicle speed and acceleration. Finally, the offgoing pressure command, both with and without one-way clutch simulation, is shown at 750 and 760 respectively.

Based on the above, it should be readily apparent that the present invention provides numerous advantages over prior friction element control during a torque phase of gear-ratio changing. The preferred embodiments provide a consistent output shaft torque profile for a powertrain system with a step-ratio automatic transmission system during a synchronous friction element-to-friction element upshift, which reduces shift shock. Also, there is a significant reduction in shift feel variability for a powertrain system with a step-ratio automatic transmission system during a synchronous friction element-to-friction element upshift. The preferred embodiments of the invention permit the use of either absolute or relative load levels which are estimated. The use of a relative load profile, instead of absolute load levels, eliminates the need of full-sensor calibration, while the use of a relative load profile only requires one point sensor calibration that corresponds to zero load level and improves robustness against sensor drift over time. The preferred embodiments also provide for reduced output shaft torque oscillation at the beginning of the inertia phase due to the release of the off-going friction element at or near the ideal release timing where its load level is zero or close to zero and robustness against the variability of off-going friction element breakaway friction coefficient by means of a quick release of the off-going friction element at the ideal synchronization timing.

Further advantages include a consistent output shaft torque profile and significant reduction in shift feel variability for a powertrain system with a step-ratio system during a torque phase of a synchronous friction element-to-friction element upshift and during a torque phase of a non-synchronous upshift with an overrunning coupling element. Further, the system provides robustness against the variability of off-going friction element breakaway friction coefficient by means of a quick release of an off-going friction element at an ideal synchronization timing during a synchronous shift and against the variability of a friction element actuation system for both synchronous and non-synchronous shifts.

A clutch load sensor assembly provides a relative measure of torque load exerted to the clutch while it is engaged. A band brake load sensor assembly provides a relative measure of engagement torque (brake torque) and its derivative during an engagement process while a band slips against a drum and a relative measure of torque load exerted onto a band and a drum while the band is securely engaged to the drum without slippage. Sensor output may be calibrated with respect to a command signal to a band servo actuator while torque load is zero. Use of a protective cover in the sensor assembly prevents a direct contact between a load sensing material and the pin for reduced sensor material wear; and shields the sensor from hostile conditions that include heat and electro-chemical interaction, such as with transmission oil.

Although described with reference to preferred embodiments of the invention, it should be understood that various changes and/or modifications can be made to the invention without departing from the spirit thereof. For example, the invention could be extended to a double-wrap band brake system. In general, the invention is only intended to be limited by the scope of the following claims.

The invention claimed is:

1. A method for controlling gear ratio shifts in a multiple-ratio automatic transmission for an automotive vehicle powertrain including an engine, an input shaft, a transmission output shaft, a set of drive wheels, gearing defining multiple torque flow paths from the input shaft to the torque output member, and first and second pressure actuated torque establishing elements for shifting from at least a first gear configuration with a low speed ratio to a second gear configuration with a higher speed ratio during a ratio upshift event having a preparatory phase, a torque phase and an inertia phase, the method comprising:
   maintaining torque capacity of the first torque establishing element against slippage during the preparatory phase;
   calculating an estimated amount of torque transmitted through the second torque establishing element by using measured and estimated torque signals; and
   increasing torque capacity of the second torque establishing element during the torque phase at a desired rate based on the estimated amount of torque so as to effect a closed loop control of the amount of torque transmitted through the second torque establishing element for at least a portion of the torque phase.

2. The method of claim 1, wherein using measured and estimated torque signals includes measuring an amount of torque transmitted through at least one portion of the transmission to generate the measured torque signal, and measuring different speeds of at least two portions of the powertrain and using the measured different speeds to generate the estimated torque signal.

3. The method of claim 2, wherein measuring the amount of torque transmitted is conducted by measuring torque transmitted through the input shaft, and measuring different speeds includes measuring at least two portions of the powertrain between the second torque establishing element and the set of drive wheels and using the measured different speeds to generate the estimated torque signal.

4. The method of claim 3, wherein measuring different speeds includes measuring a speed of the output torque member, measuring a speed of a first drive wheel of the set of drive wheels, measuring a speed of a second drive wheel of the set of drive wheels, and determining an average speed of the measured speeds of the first and second drive wheels, wherein the estimated torque signal is generated as a function of a shaft spring constant of the output shaft times the difference between the output torque member speed and the average speed of the first and second drive wheels.

5. The method of claim 2, wherein calculating the estimated amount of torque transmitted is conducted by measuring torque transmitted through the output shaft, and measuring different speeds includes measuring at least two portions of the powertrain between the engine and the second torque establishing element and using the measured different speeds to generate the estimated torque signal.

6. The method of claim 1, wherein calculating the estimated amount of torque transmitted through the second torque establishing element is conducted by measuring engine speed and turbine speed and wherein the estimated amount of torque is generated as a function of the measured engine speed and turbine speed.

7. The method of claim 1, further comprising:
   calculating an amount of torque transmitted through the first torque establishing element by using measured and estimated torque signals;
   maintaining torque capacity of the first torque establishing element during the torque phase until the estimated amount of torque transmitted through the first torque establishing element drops below a predetermined amount and then decreasing torque capacity of the first torque establishing element; and
   determining a timing for releasing the first torque establishing element based on the amount of torque transmitted through the first torque establishing element.

8. The method of claim 7, wherein calculating the estimated amount of torque transmitted through the first torque establishing element by using measured and estimated torque signals includes measuring an amount of torque transmitted through at least one portion of the transmission to generate the measured torque signal, and measuring different speeds of at least two portions of the powertrain and using the measured different speeds to generate the estimated torque signal.

9. The method of claim 8, wherein measuring the amount of torque transmitted is conducted by measuring torque transmitted through the input shaft, and measuring different speeds includes measuring at least two portions of the powertrain between the first torque establishing element and the set of drive wheels and using the measured different speeds to generate the estimated torque signal.

10. The method of claim 9, wherein measuring different speeds includes measuring a speed of the output torque member, measuring a speed of a first drive wheel of the set of drive wheels, measuring a speed of a second drive wheel of the set of drive wheels, determining an average speed of the measured speeds of the first and second drive wheels, wherein the estimated torque signal is generated as a function of a shaft spring constant of the output shaft times the difference between the output shaft speed and the average speed of the first and second drive wheels.

11. The method of claim 8, wherein calculating the estimated amount of torque transmitted is conducted by measuring torque transmitted through the output shaft and measuring different speeds includes measuring at least two portions of the powertrain between the engine and the first torque establishing element and using the measured different speeds to generate the estimated torque signal.

12. The method of claim 11, wherein calculating the estimated amount of torque transmitted through the first torque establishing element is conducted by measuring engine speed and turbine speed and wherein the estimated amount of torque is generated as a function of the measured engine speed and turbine speed.

13. The method of claim 7, wherein determining the timing for releasing the first torque establishing element further includes predicting a first amount of time that will be required to decrease the torque capacity of the first torque establishing element to substantially zero, determining when the amount of torque transmitted through the first torque establishing element will be substantially zero, and beginning to decrease the torque capacity of the first torque establishing element so that the torque capacity of the first torque establishing element will be substantially zero when the amount of torque transmitted through the first torque establishing element becomes substantially zero.

14. The method of claim 1, wherein increasing torque capacity of the second torque establishing element during the torque phase at a desired rate is based on a calibrated slope that establishes the desired rate based on measurements or estimates of torque capacity for various sub-divided intervals of the torque phase.

* * * * *